United States Patent

Yahiro et al.

Patent Number: 5,970,096
Date of Patent: Oct. 19, 1999

[54] SYNCHRONOUS SERIAL TRANSFER APPARATUS AND SYNCHRONOUS SERIAL TRANSFER METHOD

[75] Inventors: Hideki Yahiro; Kouji Hirano; Takeshi Hashizume, all of Tokyo, Japan

[73] Assignee: Mitsubishi Denki Kabushiki Kaisha, Tokyo, Japan

[21] Appl. No.: 08/963,616

[22] Filed: Nov. 4, 1997

[30] Foreign Application Priority Data

May 28, 1997 [JP] Japan .................................. 9-138209

[51] Int. Cl.$^6$ .............................. H04K 1/10; H04B 3/00; H04B 3/40; G06F 13/14

[52] U.S. Cl. ......................... 375/260; 375/257; 375/220; 370/283; 710/61

[58] Field of Search .................................. 375/260, 257, 375/377, 220, 256; 370/283, 284, 274; 326/85, 86, 87; 710/61, 14

[56] References Cited

U.S. PATENT DOCUMENTS 5,019,966  5/1991  Saito et al. .................... 710/29
5,878,281  3/1999  Itoh et al. ...................... 710/61

FOREIGN PATENT DOCUMENTS 52-67228  6/1977  Japan .
4-656     1/1992  Japan .

Primary Examiner—Chi H. Pham
Assistant Examiner—Khai Tran
Attorney, Agent, or Firm—Burns, Doane, Swecker & Mathis, LLP

[57] ABSTRACT

In a synchronous serial transfer apparatus, the number of lines which are necessary for a serial transfer is reduced, and even when a master/slave operation is to be performed, a serial transfer is possible between any communication apparatuses without using communication apparatuses which have different structures from each other such as a master and slave apparatuses and without using a master apparatus. Communication apparatuses (TR1 to TR3) are connected parallel to each other by one communication line (TRL). A potential fixing apparatus (VC), which fixes a potential on the communication line (TRL) to "High" or "Low" when outputs from all communication apparatuses (TR1 to TR3) are in a "High-Z" state, is connected to the communication line (TRL).

15 Claims, 22 Drawing Sheets

FIG. 32

| EMBODIMENT # | DATA FROM TRANSMISSION DATA OUTPUT PART | SIGNAL FROM TRANSMISSION DATA CONVERT PART | SIGNAL FROM RECEIVE DATA DETECT PART | DATA FROM RECEIVE DATA CONVERT PART |
|---|---|---|---|---|
| 1 | 1 | High | High | 1 |
|   | 0 | Low | Low | 0 |
| 2 | 0 | High | Low | 1 |
|   | 1 | Low | High | 0 |
| 3 | NO CHANGE | High | High | DATA SAME AS IMMEDIATELY PRECEDING DATA |
|   | CHANGE | Low | Low | DATA DIFFERENT FROM IMMEDIATELY PRECEDING DATA |
| 4 | CHANGE | High | Low | DATA SAME AS IMMEDIATELY PRECEDING DATA |
|   | NO CHANGE | Low | High | DATA DIFFERENT FROM IMMEDIATELY PRECEDING DATA |

FIG. 33

| SIGNAL FROM TRANSMISSION DATA CONVERT PART | OUTPUT FROM INPUT / OUTPUT INTERFACE |
|---|---|
| High | High-Z |
| Low | High-Z |

FIG. 34

| OUTPUT FROM INPUT / OUTPUT INTERFACE | SIGNAL ON COMMUNICATION LINE |
|---|---|
| High-Z | High |
| High-Z | Low |

SYNCHRONOUS SERIAL TRANSFER APPARATUS AND SYNCHRONOUS SERIAL TRANSFER METHOD

BACKGROUND OF THE INVENTION

1. Field of the Invention

The present invention relates to a synchronous serial transfer apparatus and a synchronous serial transfer method, and more particularly, to an apparatus for and a method of performing a synchronous serial transfer which reduces the number of communication lines which connect a plurality of communication apparatuses to each other.

2. Description of the Background Art

FIG. 35 shows a structure of a conventional synchronous serial transfer apparatus for performing a synchronous serial transfer. In FIG. 35, n communication apparatuses SL1 to SLn are connected to a communication apparatus SLM. The communication apparatus SLM and the communication apparatuses SL1 to SLn are electrically connected to each other by wire line groups LG which include data transmission lines 38, data receive lines 39, clock lines 40 for synchronizing a transfer between a transmit end and a receiving end and control signal lines 41.

That is, the plurality of wire line groups LG extend from the communication apparatus SLM and are respectively connected to the communication apparatuses SL1 to SLn. With the communication apparatus SLM serving as a master apparatus and the communication apparatuses SL1 to SLn serving as slave apparatuses, communication is performed only between the master apparatus and the slave apparatuses. Communication between the slave apparatuses are performed through the master apparatus.

Having such a structure as described above, the conventional synchronous serial transfer apparatus requires the wire line groups each containing four lines to electrically connect the master apparatus and the slave apparatuses. As the number of the slave apparatuses increases, more lines are necessary, thereby making control over a serial transfer complex. In addition, since it is necessary that the master apparatuses contains in advance a structure for connecting a number of the slave apparatuses, the master apparatus is large.

SUMMARY OF THE INVENTION

A synchronous serial transfer apparatus for performing a synchronous serial transfer of data according to a first aspect of the present invention comprises: a plurality of communication apparatuses for transmitting and receiving the data; and a communication line which is formed by one line which connects the plurality of communication apparatuses parallel to each other, wherein each one of the plurality of communication apparatuses comprises an interface part for outputting a high impedance state to the communication line to replace a first potential and outputting a second potential as it is to the communication line, the second potential being complementary to the first potential.

In the synchronous serial transfer apparatus according to the first aspect of the present invention, each one of the plurality of communication apparatuses comprises the interface part which outputs the high impedance state to the communication line to replace the first potential but outputs the second potential, which is complementary to the first potential, as it is to the communication line. This prevents a signal having the first potential and a signal having the second potential from getting outputted to the communication line at the same time during a communication, and therefore, eliminates a need to separately dispose data transmission lines, data receive lines, clock lines and control signal lines which are heretofore necessary. Rather, by means of only the communication line which serves as all such lines, it is possible to perform a synchronous serial transfer to the plurality of communication apparatuses.

According to a second aspect of the present invention, further comprises a potential fixing apparatus which is connected to the communication line and which fixes a potential on the communication line to the first potential when all outputs of the plurality of communication apparatuses are in the high impedance state.

In the synchronous serial transfer apparatus according to the second aspect of the present invention, it is possible to fix a potential on the communication line to the first potential when outputs of all communication apparatuses are in the high impedance state. Hence, by rendering the outputs of the communication apparatuses all in the high impedance state, it is possible to output the first potential to the communication line, and therefore, to transfer data which are formed by the first and the second potential through the communication line.

According to a third aspect of the present invention, each communication apparatus comprises: a clock signal outputting part for outputting a clock signal which defines timing of transmitting and receiving the data; a clock signal detecting part for detecting timing of a rise or a fall of the clock signal; a data outputting part for superimposing the data over the clock signal and outputting the data as transmission data; and a data detecting part for detecting whether the transmission data have the first potential or the second potential at the timing of a rise or a fall of the clock signal which is detected by the clock signal detecting part, to thereby detect the data from the transmission data.

The synchronous serial transfer apparatus according to the third aspect of the present invention provides a specific structure for a data transfer through the communication line.

According to a fourth aspect of the present invention, the first potential is "High," and the potential fixing apparatus comprises pull-up means for fixing a potential on the communication line to "High."

According to a fifth aspect of the present invention, the first potential is "Low," and the potential fixing apparatus comprises pull-down means for fixing a potential on the communication line to "Low."

The synchronous serial transfer apparatus according to the fourth and the fifth aspects of the present invention provides a more specific structure for a data transfer.

According to a sixth aspect of the present invention, each one of the plurality of communication apparatuses further comprises: an idle signal outputting part for outputting an idle signal which indicates to other ones of the plurality of communication apparatuses that each one of the plurality of communication apparatuses is an idle state where no communication is executed; and an idle signal detecting part for detecting that the other ones of the plurality of communication apparatuses are in the idle state, in response to the idle signal which is outputted by each one of the other ones of the plurality of communication apparatuses.

In the synchronous serial transfer apparatus according to the sixth aspect of the present invention, it is possible to for the communication apparatuses to confirm the idle state where no communication is performed. By defining the end of the idle state as the start of a communication operation, it is possible to time operations of the plurality of communication apparatuses.

According to a seventh aspect of the present invention, different addresses are set to the plurality of communication apparatuses so that the plurality of communication apparatuses are distinguished from each other, and a priority level for an exclusive use of the communication line is assigned to each one of the plurality of communication apparatuses, for a communication of the data, the plurality of communication apparatuses each further comprises: an address signal outputting part for outputting an address signal which indicates the addresses; an address signal detecting part for detecting the address signal; a priority level signal outputting part for outputting a priority level signal which indicates the priority level; and a priority level signal detecting part for detecting the priority level signal.

In the synchronous serial transfer apparatus according to the seventh aspect of the present invention, even when there are a number of combinations of communication operations of the plurality of communication apparatuses, a synchronous serial transfer to the plurality of communication apparatuses is possible only with the communication line which is formed by one line.

According to an eighth aspect of the present invention, the plurality of communication apparatuses each further comprises: an idle signal outputting part for outputting an idle signal which indicates to other ones of the plurality of communication apparatuses that each one of the plurality of communication apparatuses is an idle state where no communication is executed; and an idle signal detecting part for detecting that the other ones of the plurality of communication apparatuses are in the idle state, in response to the idle signal which is outputted by each one of the other ones of the plurality of communication apparatuses.

In the synchronous serial transfer apparatus according to the eighth aspect of the present invention, it is possible to for the communication apparatuses to confirm the idle state where no communication is performed. By defining the end of the idle state as the start of a communication operation, it is possible to time operations of the plurality of communication apparatuses.

According to a ninth aspect of the present invention, the address signal outputting part has a function of outputting the second potential as the address signal only during a predetermined address signal output period, and the address signal detecting part has a function of detecting whether a period of the second potential on the communication line is the same as an address signal output period which is set to the address signal detecting part, and a communication operation is performed only when the two periods coincide with each other.

The synchronous serial transfer apparatus according to the ninth aspect of the present invention provides a specific structure for designating the transmission end and the receiving end with addresses.

According to a tenth aspect of the present invention, the priority level signal outputting part has a function of outputting the second potential as the priority level signal only during a predetermined priority level signal output period, and the priority level signal detecting part has a function of detecting whether a period of the second potential on the communication line is the same as a priority level signal output period which is set to the address signal detecting part, and a communication operation is performed with a priority when the two periods coincide with each other.

The synchronous serial transfer apparatus according to the tenth aspect of the present invention provides a specific structure for communicating data in accordance with the order of priority.

According to an eleventh aspect of the present invention, the address signal outputting part has a function of outputting a transmission end address signal which indicates a transmission end of the data, and a function of outputting a receiving end address signal which indicates a receiving end of the data, the address signal detecting part has a function of receiving the transmission end address signal and detecting whether the transmission end address signal coincides with the address signal output period which is set to the address signal detecting part, and the address signal detecting part judges that the address signal detecting part is a transmission end of the data when the transmission end address signal coincides with the address signal output period which is set to the address signal detecting part, and the address signal detecting part also has a function of receiving the receiving end address signal and detecting whether the receiving end address signal coincides with the address signal output period which is set to the address signal detecting part, and the address signal detecting part judges that the address signal detecting part is a receiving end of the data when the two coincide with each other.

The synchronous serial transfer apparatus according to the eleventh aspect of the present invention provides a more specific structure for designating the transmission end and the receiving end with addresses.

A twelfth aspect of the present invention is directed to a synchronous serial transfer method for performing a synchronous serial transfer of data between a plurality of communication apparatuses through a communication line which is formed by one line, wherein the plurality of communication apparatuses each have a function of outputting a high impedance state to the communication line to replace a first potential and outputting a second potential as it is to the communication line, the second potential being complementary to the first potential, and a potential fixing apparatus is connected to the communication line, the potential fixing apparatus fixing a potential on the communication line to the first potential when all outputs of the plurality of communication apparatuses are in a high impedance state, and the method comprising the steps of: (a) outputting a clock signal in which the second potential and the high impedance state is periodically given, from a receiving end communication apparatus which is to receive the data out of the plurality of communication apparatuses; (b) outputting the data as they as superimposed over the clock signal, from a transmission end communication apparatus which is to transmit the data out of the plurality of communication apparatuses so that the potential fixing apparatus creates transmission data which are formed by the first and the potentials; and (c) detecting by the transmission end communication apparatus whether the transmission data have the first potential or the second potential, at timing of a rise or a fall of the clock signal.

In the synchronous serial transfer method according to the twelfth aspect of the present invention, data are transmitted as superimposed over the clock signal and received in accordance with the clock signal. This eliminates a need to separately dispose data transmission lines, data receive lines, clock lines and control signal lines which are heretofore necessary. Rather, by means of only the communication line which serves as all such lines, it is possible to perform a synchronous serial transfer to the plurality of communication apparatuses.

According to a thirteenth aspect of the present invention, different addresses are set to the plurality of communication apparatuses so that the plurality of communication apparatuses are distinguished from each other, and priority levels for an exclusive use of the communication line are assigned to the plurality of communication apparatuses, for a communication of the data, the method further comprising the steps of: (d) comparing the priority levels which are assigned the plurality of communication apparatuses, by communication apparatuses which have requests for a communication out of the plurality of communication apparatuses so that a communication apparatus which has the highest priority level acquires a priority right to exclusively use the communication line; (e) outputting a receiving end address signal which indicates the receiving end communication apparatus, by the communication apparatus acquiring the priority right out of the communication apparatuses which have requests for a communication; and (f) comparing the receiving end address signal with the addresses which are set unique to the plurality of communication apparatuses, by communication apparatuses other than the communication apparatus acquiring the priority right out of the plurality of communication apparatuses so that a communication apparatus whose address coincides with the receiving end address signal is recognized as the receiving end communication apparatus.

In the synchronous serial transfer method according to the thirteenth aspect of the present invention, even when there are a number of combinations of communication operations of the plurality of communication apparatuses, a synchronous serial transfer to the plurality of communication apparatuses is possible only with the communication line which is formed by one line According to a fourteenth aspect of the present invention, in the synchronous serial transfer method of the thirteenth aspect, the communication apparatus acquiring the priority right is a communication apparatus which only outputs the transmission end address signal and the receiving end address signal, the step (e) includes a step (e-1) in which the second potential is outputted only during an address signal output period which is assigned, as the transmission end address signal, and the step (f) includes a step (f-1) in which out of the plurality of communication apparatuses, communication apparatuses other than the communication apparatus acquiring the priority right detect whether a period of the second potential on the communication line coincides with the address signal output period which is assigned to each one of the plurality of communication apparatuses, so that a communication apparatus whose address signal output period coincides with the period of the second potential on the communication line is recognized as the transmission end communication apparatus.

In the synchronous serial transfer method according to the fourteenth aspect of the present invention, when a master/slave operation is to be performed in which the communication apparatus acquiring the priority right serves as a master apparatus and the other communication apparatuses serve as slave apparatuses, as the master apparatus instructs addresses of slave apparatuses which are involved in a communication, data are communicated directly between the slave apparatuses without using the master apparatus.

According to a fifteenth aspect of the present invention, the step (d) includes: a step (d-1) in which the second potential is outputted only during a priority level signal output period which is assigned, as a priority level signal which indicates the priority level; and a step (d-2) in which whether the period of the second potential on the communication line coincides with the priority level signal output period which is assigned to each one of the plurality of communication apparatuses, so that a communication apparatus whose priority level signal output period coincides with the period of the second potential on the communication line acquires the priority right.

The synchronous serial transfer method according to the fifteenth aspect of the present invention provides a specific structure for confirming the priority levels.

Accordingly, an object of the present invention is to provide a synchronous serial transfer apparatus in which the number of lines which are needed for a serial transfer is reduced, use of communication apparatuses having different structures from each other, such as a master apparatus and slave apparatuses, is not necessary for a master/slave operation, and a serial transfer is possible between any communication apparatuses and not through a master apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 32 is a diagram showing a condition in which signals are inputted and outputted in the communication apparatuses which form the synchronous serial transfer apparatus according to the present invention;

FIG. 33 is a diagram showing a relationship between a signal from a transmission data convert part and an output from an input/output interface within the communication apparatuses which form the synchronous serial transfer apparatus according to the present invention;

FIG. 34 is a diagram showing a relationship between the output from the input/output interface and a signal on a communication line within the communication apparatuses which form the synchronous serial transfer apparatus according to the present invention.

DESCRIPTION OF THE PREFERRED EMBODIMENTS

<Preferred Embodiments>

<1. Structure Of Apparatus>

Figure 1:
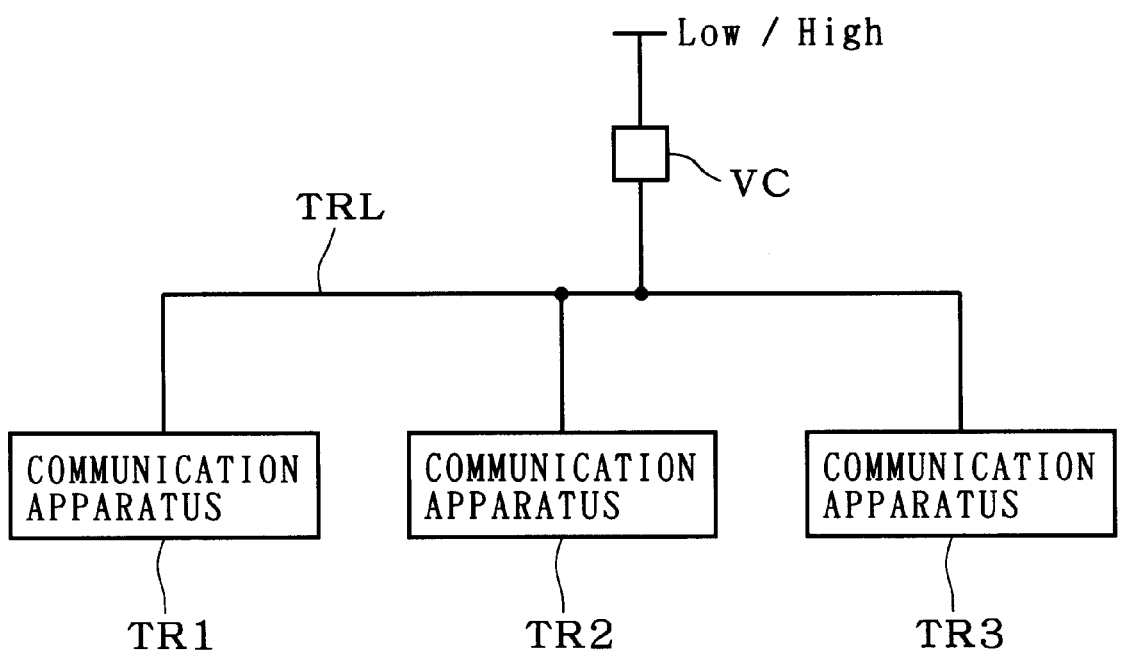
FIG. 1 is a diagram for describing a structure of a synchronous serial transfer apparatus according to a preferred embodiment of the present invention.

FIG. 1 shows a synchronous serial transfer apparatus according to the present invention. In FIG. 1, communication apparatuses TR1 to TR3 are connected parallel to each other by one communication line TRL. The communication line TRL is a line for combined use as a data transmission line, a data receive line, a clock line for synchronizing a transfer between a transmit end and a receiving end and a control signal line. Connected to the communication line TRL is a potential fixing apparatus VC which fixes a potential of the communication line TRL to a high potential (hereinafter "High") or a low potential (hereinafter "Low") when outputs from the communication apparatuses TR1 to TR3 are all in a high impedance state (hereinafter "High-Z").

Figure 2:
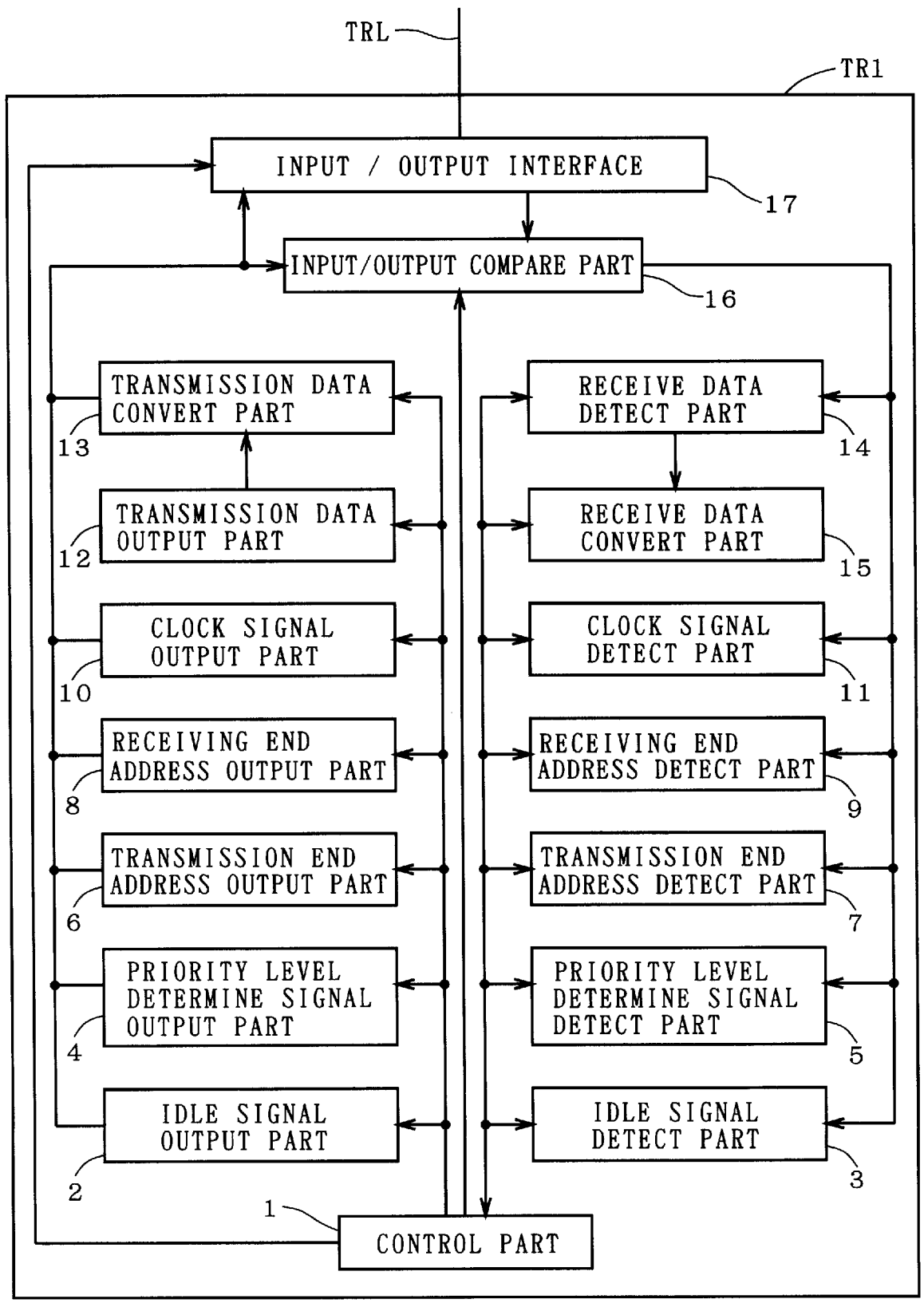
FIG. 2 is a diagram for describing a structure of communication apparatuses which form the synchronous serial transfer apparatus according to the present invention.

The communication apparatuses TR1 to TR3 have the same hardware structure. FIG. 2 shows a structure of the communication apparatus TR1 as a representative structure. The communication apparatus TR1 comprises a control part 1 which controls all operations of the communication apparatus TR1, an idle signal output part 2 which outputs a signal which is necessary for the communication apparatus TR1 to recognize that the communication line TRL is in an idle state, an idle signal detect part 3 which detects an idle signal on the communication line TRL when the idle signal is outputted to the communication line TRL, a priority level determine signal output part 4 which generates a priority level determine signal, which is outputted to determine whether to execute a request for a communication from the communication apparatus TR1, when the idle signal is detected and there is a request for a communication from the communication apparatus TR1, a priority level determine signal detect part 5 which detects whether a request from the communication apparatus TR1 is obtained from a signal on the communication line TRL and detects whether there is a priority level determine signal outputted from other communication apparatus, a transmission end address output part 6 which outputs a signal which expresses an address of data from the transmission end when a priority right is obtained, a transmission end address detect part 7 which detects the transmission end address from the signal on the communication line TRL, a receiving end address output part 8 which outputs a signal which expresses an address of the data to the receiving end, a receiving end address detect part 9 which detects the receiving end address from the signal on the communication line TRL, a clock signal output part 10 which outputs a receive clock when the communication apparatus TR1 is the receiving end, a clock signal detect part 11 which detects the clock signal from the signal on the communication line TRL, a transmission data output part 12 which outputs transmission data when the clock signal is detected from the signal on the communication line TRL, a transmission data convert part 13 which converts a signal from the transmission data output part 12 so that the signal from the transmission data output part 12 coincides with logic of the communication line TRL, a receive data detect part 14 which detects receive data from the signal on the communication line TRL, a receive convert part 15 which converts a signal from the receive data detect part 14 so that the signal from the receive data detect part 14 coincides logic within the communication apparatus TR1, an input/output compare part 16 which compares a signal into the communication apparatus TR1 with a signal from the communication apparatus TR1, and an input/output interface 17 for an interface between the communication apparatus TR1 and the communication line TRL.

The control part 1 is connected to the all structures. The input/output compare part 16 is connected to the all structures except for the transmission data output part 12 and the receive convert part 15.

The input/output interface 17 further has a function of converting a signal from the communication apparatus TR1 from the "Low" state to the "High-Z" state or from the "High" state to the "High-Z" state when the signal from the communication apparatus TR1 is outputted to the communication line TRL.

<2. Operations Of Apparatus>

<2-1. First Example Of Operations>

A first example of operations of the synchronous serial transfer apparatus according to the present invention will be described with reference to FIGS. 3 to 12. In this example, the potential fixing apparatus VC has a structure, such as a pull-up resistor, which fixes a potential of the communication line TRL from the "High-Z" state to the "High" state. The input/output interface 17 has a function of converting a signal from the communication apparatus TR1 from the "High" state to the "High-Z" state when the signal from the communication apparatus TR1 is outputted to the communication line TRL. Further, the transmission data convert part 13 has a conversion function of converting data "0" into a signal "Low" and data "1" into a signal "High," while the receive convert part 15 has a conversion function of converting a signal "Low" into data "0" and a signal "High" into data "1" (See FIG. 32).

Figure 3:
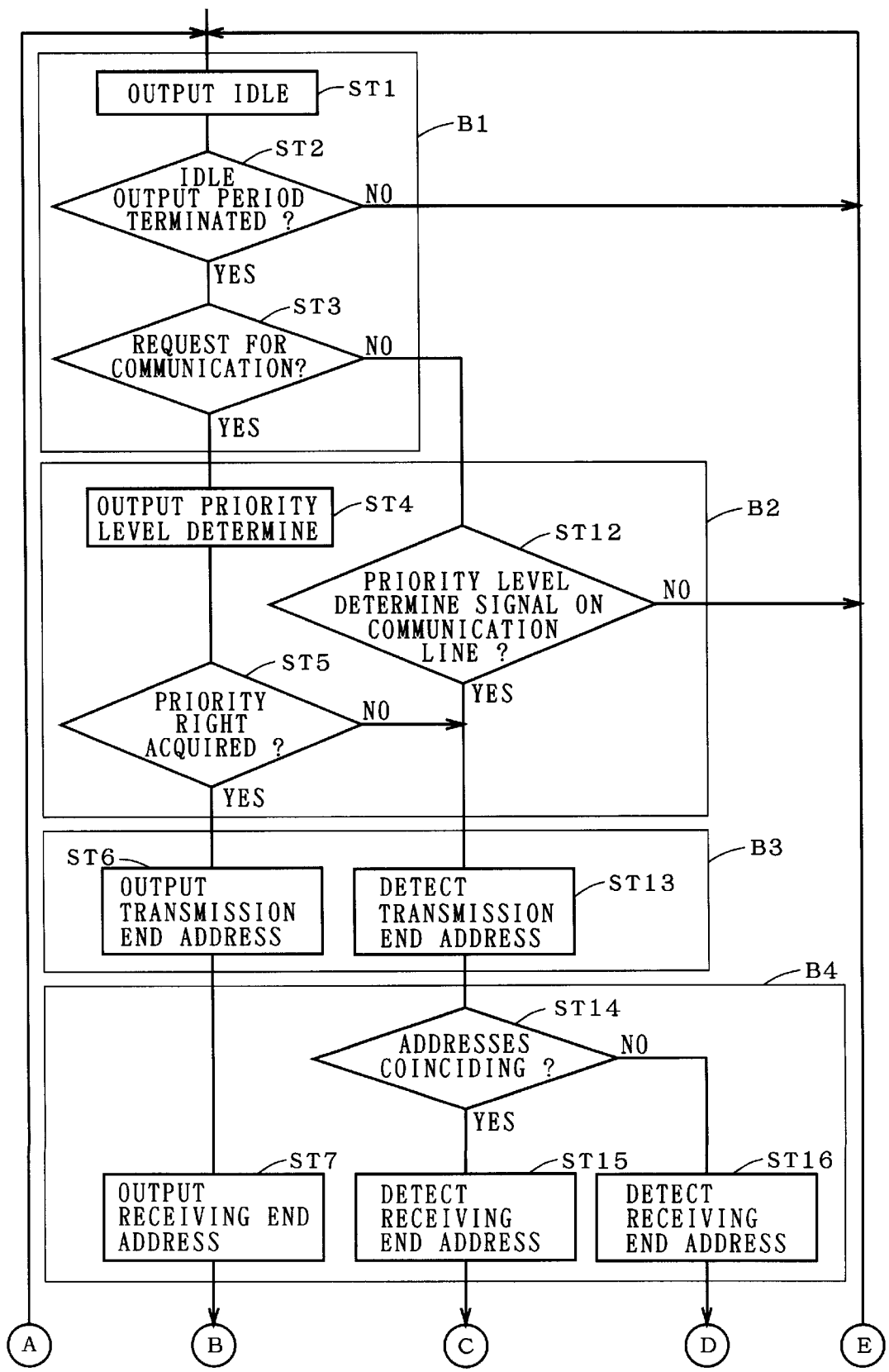
FIGS. 3 and 4 are flowcharts for describing operations of the synchronous serial transfer apparatus according to the present invention.
Figure 4:
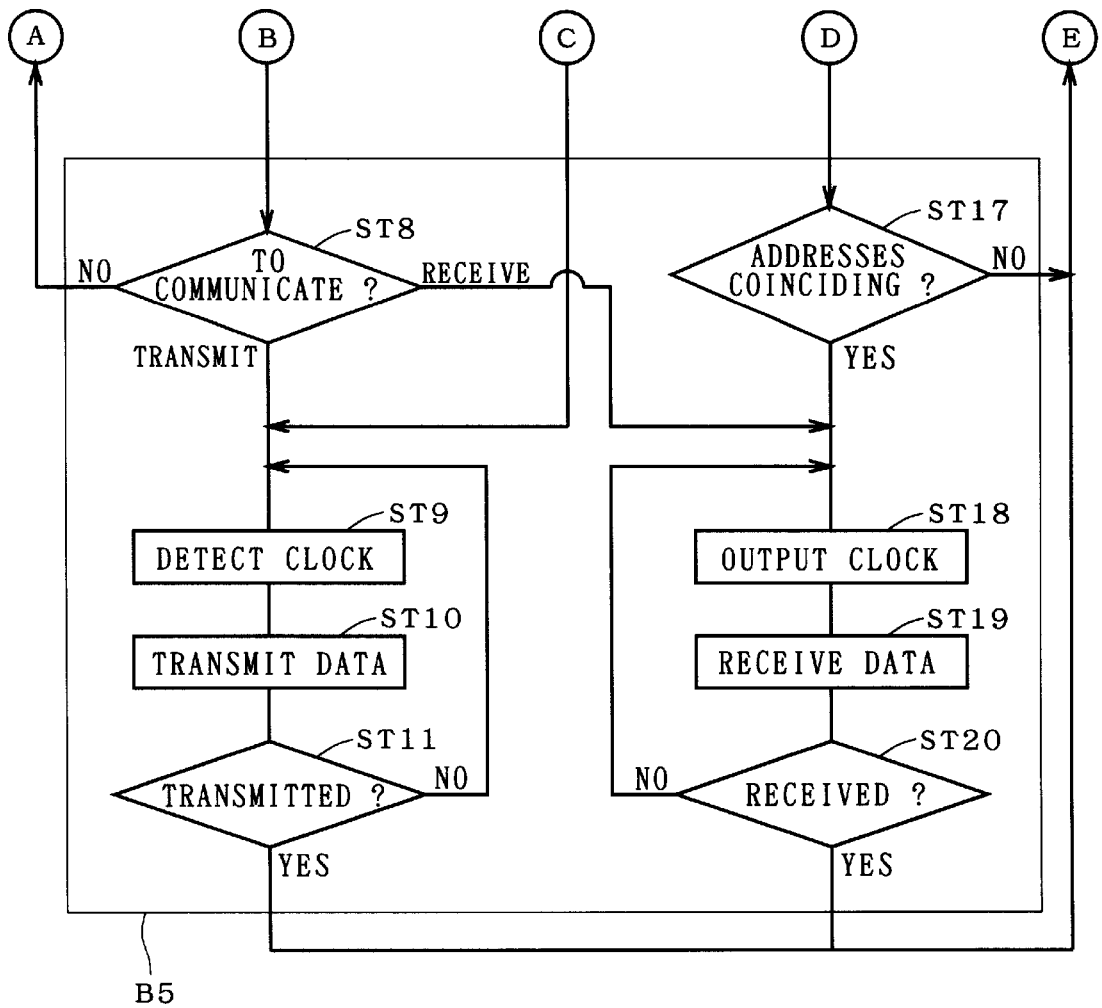

FIGS. 3 and 4 are flowcharts showing operations of a communication apparatus. FIGS. 3 and 4 are linked to each other at points A to E.

In FIG. 3, steps ST1 to ST3 will be referred to as a block B1, steps ST4, ST5 and ST12 will be referred to as a block B2, steps ST6 and ST13 will be referred to as a block B3, and steps ST7 and ST14 to ST16 will be referred to as a block B4. In FIG. 4, steps ST8 to ST11 and ST17 to ST20 will be referred to as a block B5.

First, at the step ST1 in FIG. 3, all the communication apparatuses TR1 to TR3 output the signals "High" at the idle signal output parts 2 during an idle signal output period T1, whereby the input/output interface 17 creates the "High-Z" state and a signal S0 on the communication line TRL becomes idle.

Figure 5:
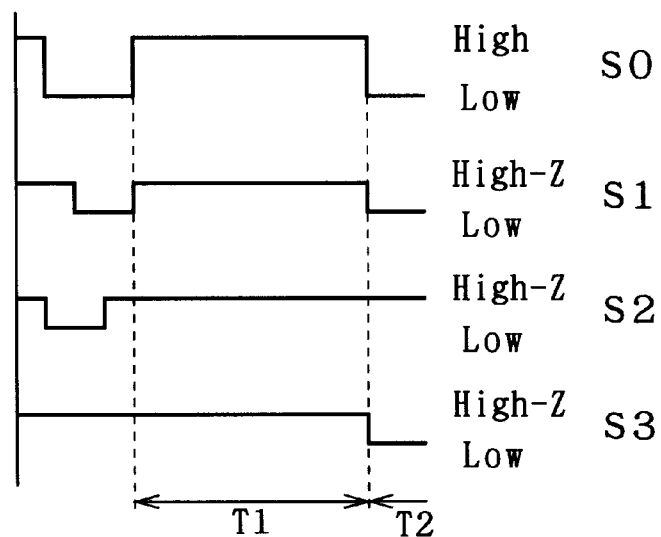
FIGS. 5 to 12 are time charts for describing a first example operations of the synchronous serial transfer apparatus according to the present invention.

FIG. 5 shows a timing chart regarding the signal S0 on the communication line TRL and output signals S1 to S3 from the communication apparatuses TR1 to TR3 during the idle signal output period. In FIG. 5, during the idle signal output period T1, the outputs from the communication apparatuses TR1 to TR3 are in the "High-Z" state and the signal S0 on the communication line TRL is "High."

At the step ST2, the communication apparatuses TR1 to TR3 each compare, at each input/output compare part 16, an input signal from each input/output interface 17, namely the signal S0 on the communication line TRL ("High" in this example), with a signal from each idle signal output part 2 ("High" in this example). Based on whether the two signals coincide with each other, the communication apparatuses TR1 to TR3 judge whether the idle signal output period is continuing. If the idle signal output period is continuing, the step ST2 is repeated again. If the idle signal output period is over, the sequence proceeds to the next step ST3.

Figure 6:
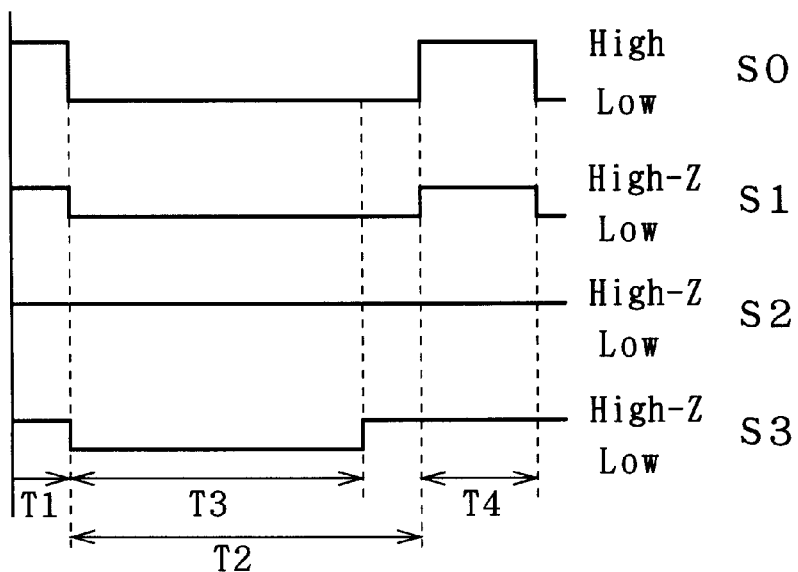

At the step ST3, in each one of the communication apparatuses TR1 to TR3, the control part 1 confirms whether there is a request for a communication. If the communication apparatuses TR1 and TR3 have requests for a communication, for example, the priority level determine signal output parts 4 of the communication apparatuses TR1 and TR3 each outputs the signal "Low" to the communication line TRL only during a period which is set unique in advance to each communication apparatus (i.e., priority level determine signal output periods T2 and T3) (step ST4). FIG. 6 is a timing chart showing the signal S0 on the communication line TRL and the output signals S1 to S3 from the communication apparatuses TR1 to TR3 as they are at this stage. In this example, the communication apparatuses TR1 and TR3 both request to communicate with the communication apparatus TR2.

In FIG. 6, the communication apparatuses TR1 and TR3 output the signals "Low" during the priority level determine signal output periods T2 and T3, respectively. As herein termed, the priority level determine signals are signals which are outputted to select one of the communication apparatuses which have requests for a communication so that a simultaneous communication by the plurality of communication apparatuses, i.e., collision of the signals on the communication line TRL is prevented. The longer the priority level determine signal output period is, the stronger the request of the associated priority level determine signal is (i.e., the higher the priority level is).

FIG. 6 shows a period T4 as well during which the signal S0 on the communication line TRL becomes "High" after the priority level determine signal output periods terminate. The period T4 is shorter than the period T1.

In the communication apparatus TR2 which does not have a request for a communication, since the control part 1 does not recognize a request for a communication, the communication apparatus TR2 keeps outputting "High-Z." Through the input/output compare part 16, the priority level determine signal detect part 5 detects whether the priority level determine signal is outputted to the signal S0 which is on the communication line TRL, i.e., whether the signal S0 is "Low" (step ST12). If the priority level determine signal is outputted, the sequence proceeds to the step ST13. If the priority level determine signal is not outputted, the step ST1 and the subsequent steps are repeated.

On the other hand, the communication apparatuses TR1 and TR3 each compare, at each input/output compare part 16, its priority level determine signal with the signal S0 which is on the communication line TRL. When the priority level determine signal output period terminates and the output enters the "High-Z" state, if the signal S0 on the communication line TRL is "High," the communication apparatuses TR1 and TR3 each recognizes, at each priority level determine signal detect part 5, that its request is allowed, i.e., it has acquired a priority right (step ST5). In this example, since the communication apparatus TR1 has a longer priority level determine signal output period than the communication apparatus TR3, the signal S0 becomes "High" at the timing that the signal S1 enters the "High-Z" state. In short, a priority right is given to the communication apparatus TR1. Consequently, a communication (i.e., an exclusive use of the communication line TRL) between the communication apparatuses TR1 and TR2 is prioritized in this example. The communication apparatus TR1 is the transmission end while the communication apparatus TR2 is the receiving end.

After confirming the priority right, the communication apparatus TR1 maintains the period in which the output signal S1 is "High-Z" exactly during the predetermined period T4. At this stage, the signal S0 on the communication line TRL becomes "High" only during the predetermined period T4.

Figure 7:
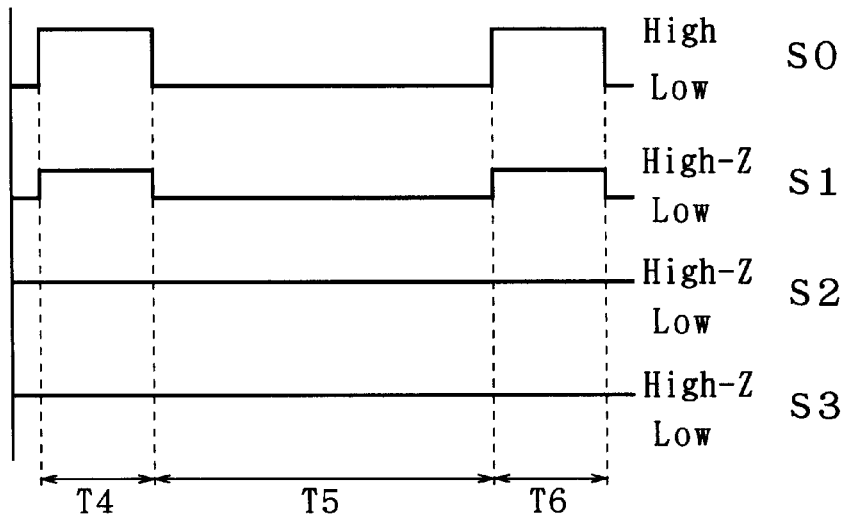

After the period T4, the communication apparatus TR1 outputs, at the transmission end address output part 6, "Low" during the period which is set unique to the communication apparatus TR1 (a transmission end address signal output period T5 in this example), as a transmission end address signal which expresses that the communication apparatus TR1 is the transmission end (step ST6). FIG. 7 is a timing chart showing the signal S0 on the communication line TRL and the output signals S1 to S3 from the communication apparatuses TR1 to TR3 as they are at this stage.

On the other hand, while maintaining the "High-Z" state, the communication apparatuses TR2 and TR3 each detect, at each transmission end address detect part 7 through each input/output compare part 16, that the transmission end is the communication apparatus TR1.

Detection of the transmission end is realized by detecting the length of the transmission end address signal output period T5 which is set unique to the communication apparatus TR1, namely, the period in which the signal S0 on the communication line TRL is "Low" (step ST13), and thereafter comparing, by the respective transmission end address detect parts 7, the transmission end address signal output periods which are set unique in advance to the respective communication apparatuses with the transmission end address signal output period T5 unique to the communication apparatus TR1 which is detected at the step ST13 (step ST14).

In this example, since the communication apparatus TR1 is the transmission end, the lengths of the transmission end address signal output periods do not coincide with each other at the step ST14, and the sequence proceeds to the step ST16. However, if either the communication apparatus TR2 or TR3 is the transmission end, the sequence proceeds to the step ST15. Operations after proceeding to the step ST15 will be described in detail in relation to a fifth example of operations.

After the transmission end address signal output period T5 is over, the output signal S1 from the communication apparatus TR1 enters the "High-Z" state only during a period T6. At this stage, the signal S0 on the communication line TRL is "High." The period T6 is shorter than the period T1.

Figure 8:
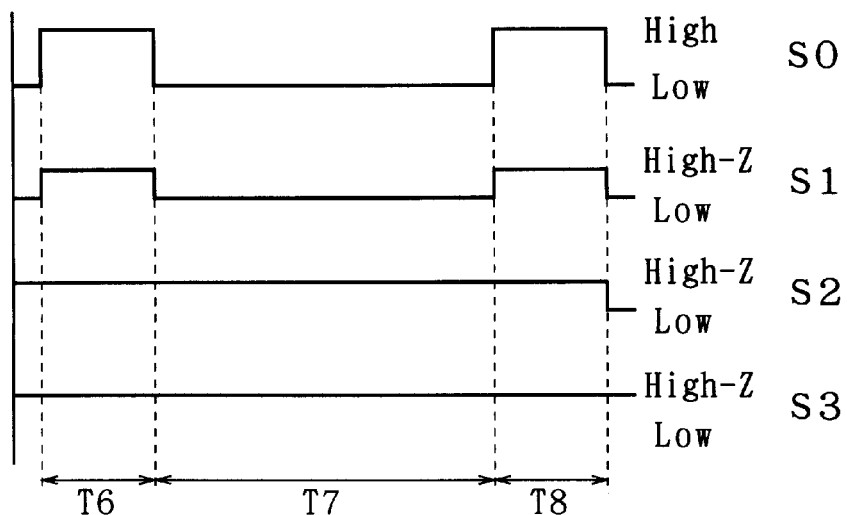

Following this, the communication apparatus TR1 outputs, at the receiving end address output part 8, the signal "Low" exactly during a predetermined period (i.e., a receive address signal output period T7 in this example), as a receive address signal which represents an address of the receiving end (step ST7). A communication apparatus which has a priority right designates addresses of the transmission end and the receiving end, and such a communication apparatus is the communication apparatus TR1 in this example. FIG. 8 is a timing chart showing the signal S0 on the communication line TRL and the output signals S1 to S3 from the communication apparatuses TR1 to TR3 as they are at this stage.

On the other hand, while maintaining the "High-Z" state, the communication apparatuses TR2 and TR3 each detect, at each receiving end address detect part 9 through each input/output compare part 16, which is the receiving end.

Detection of the receiving end is realized by detecting the length of the receiving end address signal output period T7, namely, the period in which the signal S0 on the communication line TRL is "Low" (step ST16), and thereafter comparing, by the respective receiving end address detect parts 9, the "Low" periods expressing the addresses which are set unique to the respective communication apparatuses with the receiving end address signal output period T7 at the step ST17 which is shown in FIG. 4. In this example, the receiving end address signal output period T7 coincides with the "Low" period expressing the address which is set unique to the communication apparatus TR2.

If either the communication apparatus TR2 or TR3 which does not have a priority right is the transmission end, the same operation as that at the step ST16 is performed at the step ST15, to thereby detect the length of the receiving end address signal output period T7. In this case, the communication apparatus TR2 or TR3 which is the transmission end proceeds to the step ST9 and executes a transmission. Operations in such a case will be described in detail in relation to the fifth example of operations.

After the receiving end address is outputted, the output signal S1 from the communication apparatus TR1 enters the "High-Z" state. At this stage, the signal S0 on the communication line TRL becomes "High" during a predetermined period T8. The period T8 is from a point when the signal S1 enters the "High-Z" state until the communication apparatus TR2 starts outputting a receive clock. The period T8 is shorter than the period T1.

Once it is detected at the step ST17 that the receiving end is the communication apparatus TR2 based on coincidence of the addresses, after the period T8 terminates, the clock signal output part 10 of the communication apparatus TR2 starts outputting the receive clock (step ST18), whereby a data communication period T9 starts.

Figure 9:
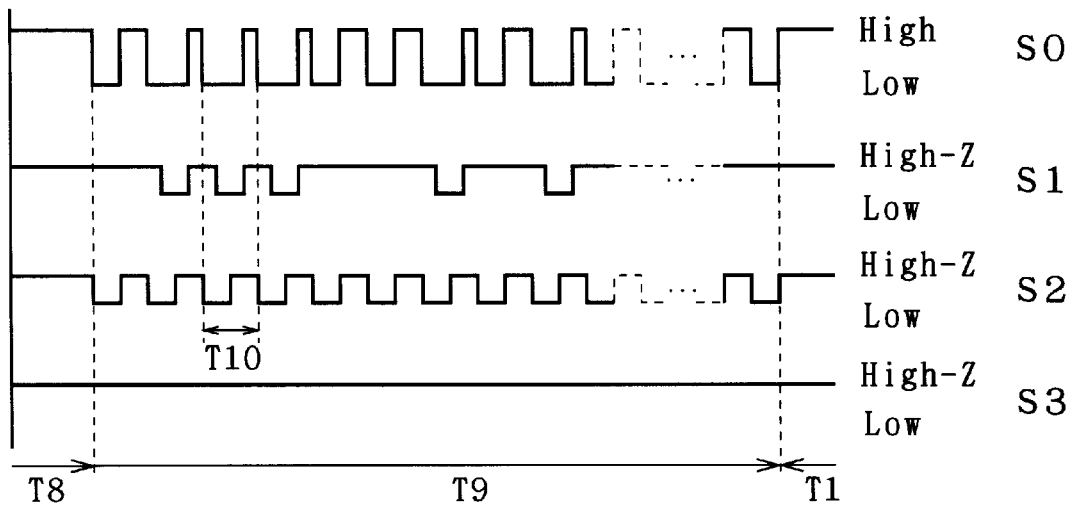
Figure 10:
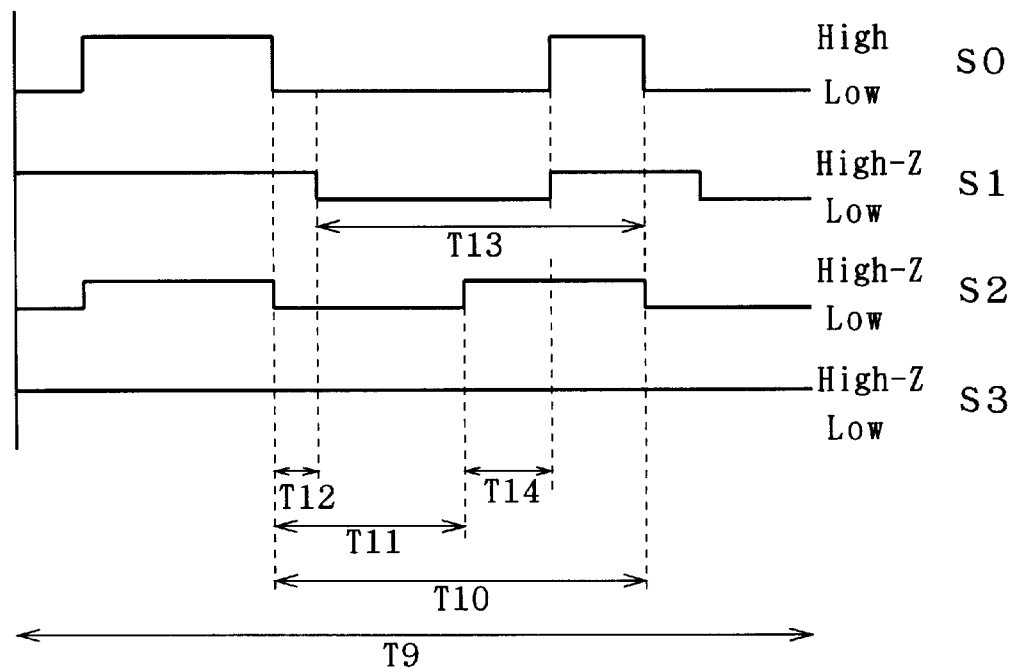

FIG. 9 is a timing chart showing the signal S0 on the communication line TRL and the output signals S1 to S3 from the communication apparatuses TR1 to TR3 as they are at this stage. FIG. 10 shows detailed timing at which the communication apparatus TR1 transmits data and detailed timing at which the communication apparatus TR2 takes in the data as shown in FIG. 9.

The communication apparatus TR1 which is the transmission end starts transmitting at the step ST8 of FIG. 4, and detects at the clock signal detect part 11 through the input/output compare part 16 that the signal S0 on the communication line TRL becomes "Low" (step ST9). More precisely, as shown in FIG. 10, the communication apparatus TR1 detects a fall of the receive clock at a fall of the signal S0 on the communication line TRL.

During a period T11, i.e., a "Low" period out of one cycle T10 of the receive clock, after a predetermined period T12 (i.e., transmission end data output setup period) since the fall of the receive clock, the transmission data output part 12 transmits data only during a predetermined period (i.e., transmission end data output period) T13 which is equal to or longer than (T11–T12) but is shorter than (T10–T12) (step ST10). In this case, the data transmitted from the communication apparatus TR1 is "Low."

The signal from the transmission data output part 12 of the communication apparatus TR1 is "High" when the transmission data convert part 13 is to output data "1" but is "Low" when the transmission data convert part 13 is to output data "0." As a result, through the input/output interface 17, the "High-Z" state and the signal "Low" are respectively outputted to the communication line TRL.

After the data output period T13, the signal "High" is made "High-Z," that is, the communication line TRL is made "High-Z" through the input/output interface 17. At this stage, T13=T11+T14–T12.

If the communication apparatus TR1 is a receiving end, for example, but is not a transmission end, the sequence switches to the operation at the step ST18 from the operation at the step ST8. If the communication apparatus TR1 is not a receiving end nor a transmission end but only designates a receiving end and a transmission end, the sequence returns to the operation at the step ST1. Operations in such a case will be described in detail in relation to the fifth example of operations.

The communication apparatus TR2 which is the receiving end detects a change of the signal S0 on the communication line TRL when its receive clock falls, and if the two signals coincides with each other, receives the data (step ST19).

More precisely, at the receive data detect part 14 through the input/output compare part 16, the communication apparatus TR2 detects whether the fall of the receive clock coincides with the fall of the signal S0 on the communication line TRL. This is an operation which is necessary for the communication apparatus TR2 to confirm that the communication apparatus TR1 sets the communication line TRL open (i.e., "High-Z" state) and to accordingly set the signal S2 "Low" once before receiving the data.

The data are received in the predetermined period T14 (i.e., transmission end data output hold period) after a rise of the receive clock, that is, after the period T11 of FIG. 10 terminates. More particularly, at a rise of the receive clock (signal S2 in this example), if the signal S0 stays "Low," the receive data detect part 14 recognizes that the signal "Low" is outputted by the communication apparatus TR1 as the signal S1, and the receive convert part 15 converts the data into data "0" and takes in the converted data.

If the signal S0 rises at the same timing that the signal S2 rises, the receive data detect part 14 recognizes that the signal "High" is outputted by the communication apparatus TR1 as the signal S1, and the receive convert part 15 converts the data into data "1" and takes in the converted data.

During the data communication period T9, the communication apparatus TR3 which is not relevant to the communication maintains the "High-Z" state. The period in which the receive clock (i.e., signal S2) is "High-Z" needs to be shorter than the period T1 in some cases.

In the communication apparatuses TR1 and TR2, the control part 1 confirms whether communication data is left remaining, every time one piece of data is transmitted (steps ST11 and ST20). If there is transfer data left remaining, the sequence returns to the step ST9 and the step ST18 to thereby repeat transfer of data. If there is no transfer data left remaining, the communication apparatus TR2 which is the receive end stops outputting the receive clock, so that the outputs from the communication apparatus TR1 which is the transmission end and the communication apparatus TR2 which is the receive end both become the "High-Z" state, and the sequence proceeds to the step ST1 to thereby render idle state which is the signal S0 on the communication line TRL.

In the block B5, when the communication apparatus TR2 which is the receive end has a request to suspend receiving the data, outputting of the receive clock is suspended and the signal S2 is made "High-Z," whereby the request is satisfied.

Figure 11:
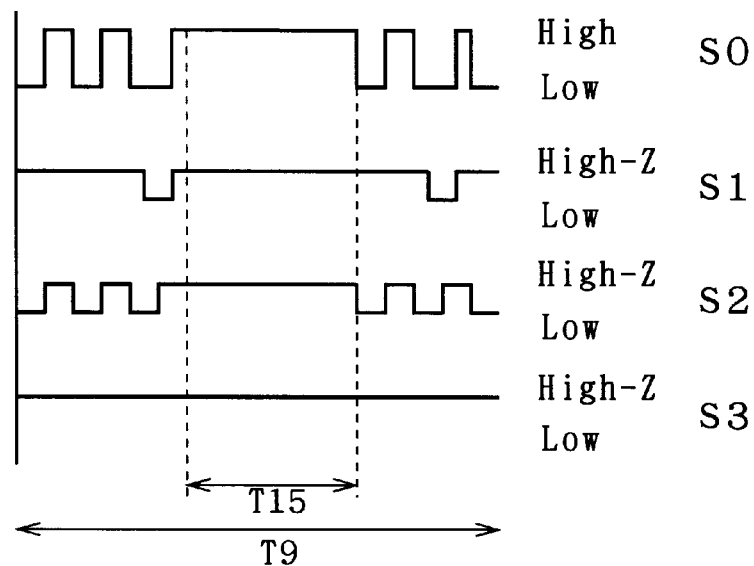

FIG. 11 is a timing chart showing the signal S0 on the communication line TRL and the output signals S1 to S3 from the communication apparatuses TR1 to TR3 as they are at this stage. The communication apparatus TR1 which is the transmission end detects the fall of the signal S0 on the communication line TRL and transmits the data, and therefore, if the receive clock which is outputted from the communication apparatus TR2 which is the receive end is maintained in the "High-Z" state, the signal S0 cannot become "Low." Since this prohibits the communication apparatus TR1 from detecting the fall of the signal S0 during a clock suspend period T15, it is not possible to transmit the data. As the communication apparatus TR2 starts outputting the clock again, the communication apparatus TR1 detects the fall of the clock and resumes the transmission of the data. To prevent the clock suspend period T15 from getting confused with the idle period T1, the period T15 is set shorter than the idle period T1.

It is when time needs be secured for the purpose of processing data on the receiving end that receipt of the data is to be suspended. Hence, software and a system are designed in such a manner that receipt of data will not be suspended for a long time.

Figure 12:
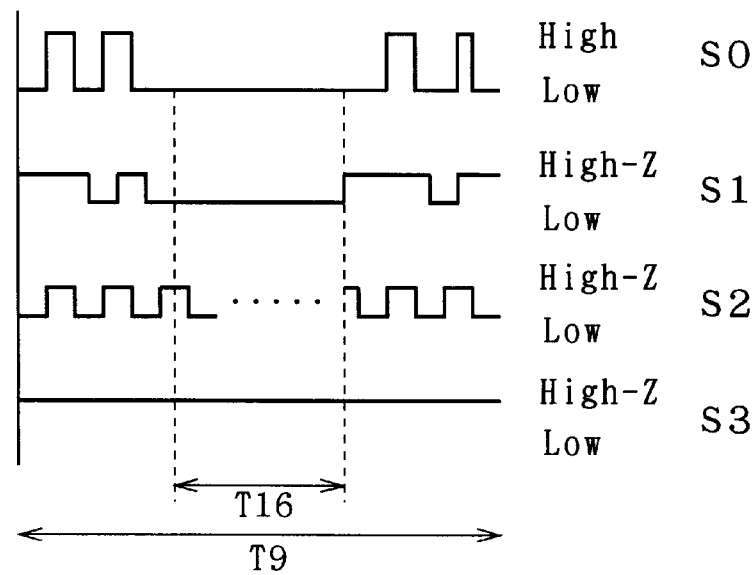

Further, in the block B5, when the communication apparatus TR1 which is the transmission end requests to suspend the transmission, the request is satisfied by maintaining the signal S1 in the "Low" state. FIG. 12 is a timing chart showing the signal S0 on the communication line TRL and the output signals S1 to S3 from the communication apparatuses TR1 to TR3 as they are at this stage.

When the receive clock outputted by the communication apparatus TR2 falls, the communication apparatus TR2 which is the receiving end detects a change in the signal S0 on the communication line TRL and accordingly detects that there are transmission data. Hence, if the communication apparatus TR1 which is the transmission end keeps the output in the "Low" state during a predetermined period (i.e., data transmission suspend period) T16, the signal SO does not change at the fall of the receive clock. Therefore, the communication apparatus TR2 which is the receiving end recognizes that the transmission is suspended. When the communication apparatus TR1 enters the "High-Z" state, the communication apparatus TR2 recognizes that the transmission is resumed.

<2-2. Second Example Of Operations>

A second example of operations of the synchronous serial transfer apparatus according to the present invention will be described with reference to FIGS. 3 to 8 and 13 to 16. In this example, the potential fixing apparatus VC has a structure, such as a pull-up resistor, which fixes a potential of the communication line TRL from the "High-Z" state to the "High" state. The input/output interface 17 has a function of converting a signal from the communication apparatus TR1 from the "High" state to the "High-Z" state when the signal from the communication apparatus TR1 is outputted to the communication line TRL. Further, the transmission data convert part 13 has a conversion function of converting data "1" into a signal "Low" and data "0" into a signal "High," while the receive convert part 15 has a conversion function of converting a signal "Low" into data "1" and a signal "High" into data "0" (See FIG. 32).

In this example, since the operations in the blocks B1 to B4 which are shown in FIG. 3 are similar to the first example of operations described with reference to FIGS. 5 to 8, a redundant description will be simply omitted.

Once it is detected at the step ST17 which is shown in FIG. 4 that the receiving end is the communication apparatus TR2 based on coincidence of the addresses, after the period T8 terminates, the communication apparatus TR2 starts outputting the receive clock from the clock signal output part 10 (step ST18), whereby the data communication period T9 starts.

Figure 13:
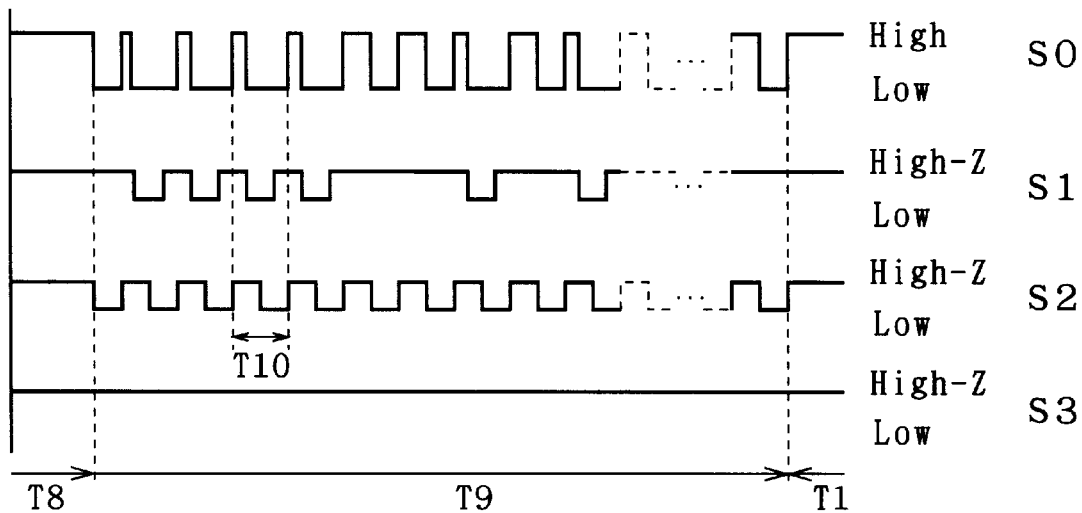
FIGS. 13 to 16 are time charts for describing a second example operations of the synchronous serial transfer apparatus according to the present invention.
Figure 14:
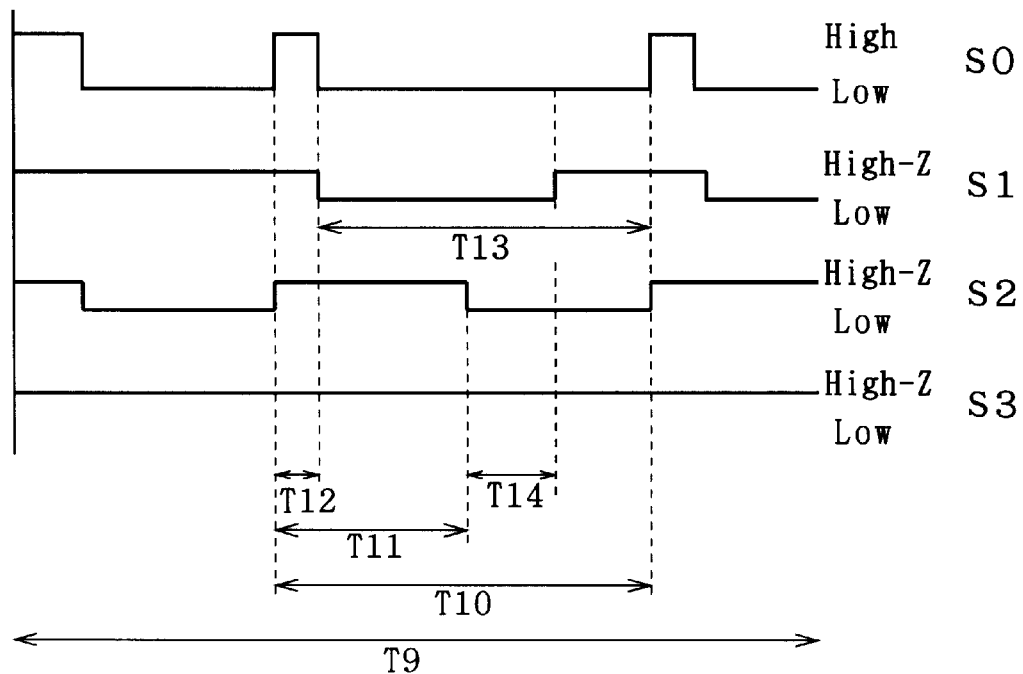

FIG. 13 is a timing chart showing the signal S0 on the communication line TRL and the output signals S1 to S3 from the communication apparatuses TR1 to TR3 as they are at this stage. FIG. 14 shows detailed timing at which the communication apparatus TR1 transmits data and detailed timing at which the communication apparatus TR2 takes in the data as shown in FIG. 13.

The communication apparatus TR1 which is the transmission end starts transmitting at the step ST8 of FIG. 4, and detects at the clock signal detect part 11 through the input/output compare part 16 that the signal S0 on the communication line TRL becomes "Low" (step ST9). More precisely, as shown in FIG. 14, the communication apparatus TR1 detects a rise of the receive clock at a rise of the signal S0 on the communication line TRL.

During a period T17, i.e., a "High" period out of one cycle T10 of the receive clock, after the predetermined period T12 (i.e., transmission end data output setup period) since the rise of the receive clock, the transmission data output part 12 transmits data only during the predetermined period (i.e., transmission end data output period) T13 which is equal to or longer than (T17–T12) but is shorter than (T10–T12) (step ST10). In this case, the data transmitted from the communication apparatus TR1 is "Low."

The signal from the transmission data output part 12 of the communication apparatus TR1 is "Low" when the transmission data convert part 13 is to output data "1" but is "High" when the transmission data convert part 13 is to output data "0." As a result, through the input/output interface 17, the "High-Z" state and the signal "Low" are respectively outputted to the communication line TRL.

After the data output period T13, the signal "High" is made "High-Z," that is, the communication line TRL is made "High-Z" through the input/output interface 17. At this stage, T13=T11+T14–T12.

If the communication apparatus TR1 is -a receiving end, for example, but is not a transmission end, the sequence switches to the operation at the step ST18 from the operation at the step ST8. If the communication apparatus TR1 is not a receiving end nor a transmission end but only designates a receiving end and a transmission end, the sequence returns to the operation at the step ST1. Operations in such a case will be described in detail in relation to the fifth example of operations.

The communication apparatus TR2 which is the receiving end detects a change of the signal S0 on the communication line TRL when its receive clock rises, and if the two signals coincides with each other, receives the data (step ST19).

More precisely, at the receive data detect part 14 through the input/output compare part 16, the communication apparatus TR2 detects whether the rise of the receive clock coincides with the rise of the signal S0 on the communication line TRL. This is necessary for the communication apparatus TR1 sets the communication line TRL open (i.e., "High-Z" state) before the communication apparatus TR2 receives the data.

The data are received in the predetermined period T14 (i.e., transmission end data output hold period) after a fall of the receive clock, that is, after the period T17 of FIG. 10 terminates. More particularly, at a fall of the receive clock (signal S2 in this example), if the signal S0 stays "Low," the receive data detect part 14 recognizes that the signal "Low" is outputted by the communication apparatus TR1 as the signal S1, and the receive convert part 15 converts the data into data "1" and takes in the converted data.

If the signal S0 falls at the same timing that the signal S2 falls, the receive data detect part 14 recognizes that the signal "High" is outputted by the communication apparatus TR1 as the signal S1, and the receive convert part 15 converts the data into data "0" and takes in the converted data.

During the data communication period T9, the communication apparatus TR3 which is not relevant to the communication maintains the "High-Z" state. The period in which the receive clock (i.e., signal S2) is "High-Z" needs to be shorter than the period T1 in some cases.

In the communication apparatuses TR1 and TR2, the control part 1 confirms whether communication data is left remaining, every time one piece of data is transmitted (steps ST11 and ST20). If there is transfer data left remaining, the sequence returns to the step ST9 and the step ST18 to thereby repeat transfer of data. If there is no transfer data left remaining, the communication apparatus TR2 which is the receive end stops outputting the receive clock, so that the outputs from the communication apparatus TR1 which is the transmission end and the communication apparatus TR2 which is the receive end both become the "High-Z" state, and the sequence proceeds to the step ST1 to thereby render idle state which is the signal S0 on the communication line TRL.

In the block B5, when the communication apparatus TR2 which is the receive end has a request to suspend receiving the data, outputting of the receive clock is suspended and the "Low" state is maintained, whereby the request is satisfied.

Figure 15:
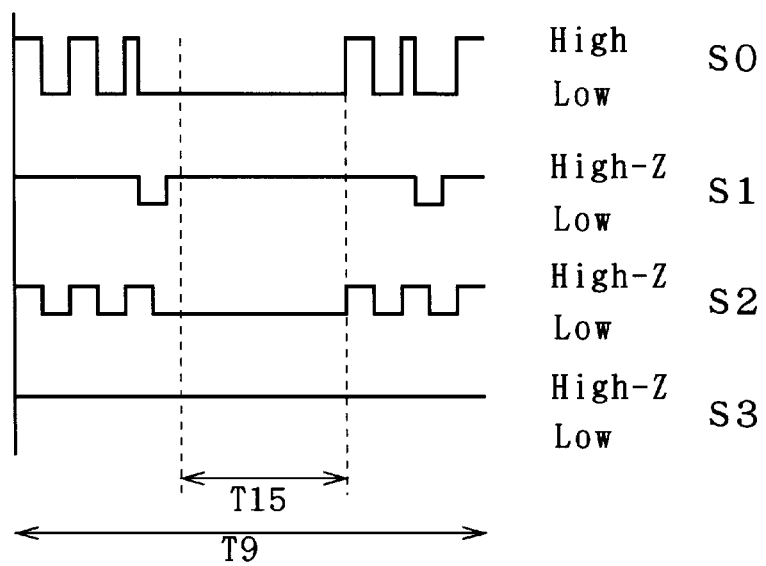

FIG. 15 is a timing chart showing the signal S0 on the communication line TRL and the output signals S1 to S3 from the communication apparatuses TR1 to TR3 as they are at this stage. The communication apparatus TR1 which is the transmission end detects the rise of the signal S0 on the communication line TRL and transmits the data, and therefore, if the receive clock which is outputted from the communication apparatus TR2 which is the receive end is maintained in the "Low" state, the signal S0 cannot become "High" state. Since this prohibits the communication apparatus TR1 from detecting the rise of the signal S0 during the clock suspend period T15, the communication apparatus TR1 cannot transmit the data. As the communication apparatus TR2 starts outputting the clock again, the communication apparatus TR1 detects the rise of the clock and resumes the transmission of the data. To prevent the clock suspend period T15 from getting confused with the idle period T1, the period T15 is set shorter than the idle period T1.

It is when time needs be secured for the purpose of processing data on the receiving end that receipt of the data is to be suspended. Hence, software and a system are designed in such a manner that receipt of data will not be suspended for a long time.

Figure 16:
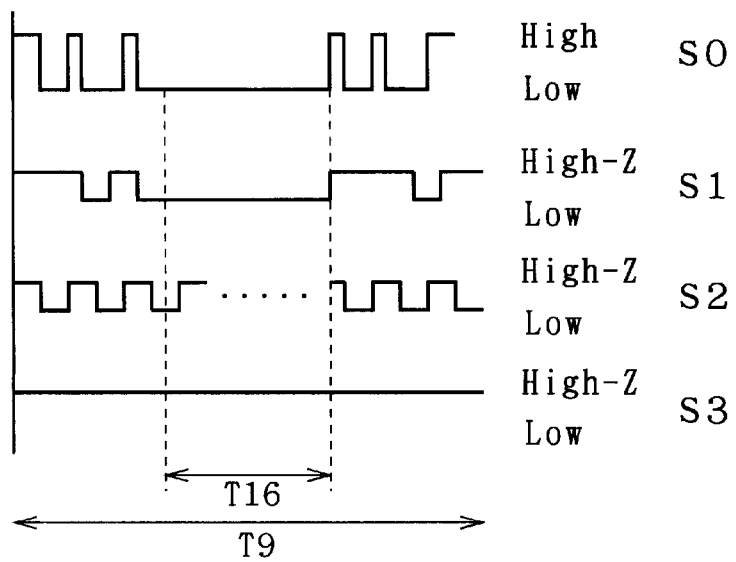

Further, in the block B5, when the communication apparatus TR1 which is the transmission end requests to suspend the transmission, the request is satisfied by maintaining the signal S1 in the "Low" state. FIG. 16 is a timing chart showing the signal S0 on the communication line TRL and the output signals S1 to S3 from the communication apparatuses TR1 to TR3 as they are at this stage.

When the receive clock outputted by the communication apparatus TR2 rises, the communication apparatus TR2 which is the receiving end detects a change in the signal S0 on the communication line TRL and accordingly detects that there are transmission data. Hence, if the communication apparatus TR1 which is the transmission end keeps the output in the "Low" state during the predetermined period (i.e., data transmission suspend period) T16, the signal SO does not change at the fall of the receive clock. Therefore, the communication apparatus TR2 which is the receiving end recognizes that the transmission is suspended. When the communication apparatus TR1 enters the "High-Z" state, the communication apparatus TR2 recognizes that the transmission is resumed/

<2-3. Third Example Of Operations>

A third example of operations of the synchronous serial transfer apparatus according to the present invention will be described with reference to FIGS. 3, 4 and 17 to 24. In this example, the potential fixing apparatus VC has a structure, such as a pull-down resistor, which fixes a potential of the communication line TRL from the "High-Z" state to the "Low" state. The input/output interface 17 has a function of converting a signal from the communication apparatus TR1 from the "Low" state to the "High-Z" state when the signal from the communication apparatus TR1 is outputted to the communication line TRL. Further, the transmission data convert part 13 has a function of outputting a signal "Low" when there is a change in data but outputting a signal "High" when there is no change in data. The receive convert part 15 has a conversion function of converting a signal "Low" into data which are different from immediately preceding data and a signal "High" into data which are the same as the immediately preceding data (See FIG. 32).

First, at the step ST1 in FIG. 3, all the communication apparatuses TR1 to TR3 output the signals "Low" at the idle signal output parts 2 during the idle signal output period T1, whereby the input/output interface 17 creates the "High-Z" state and the signal S0 on the communication line TRL becomes idle state.

Figure 17:
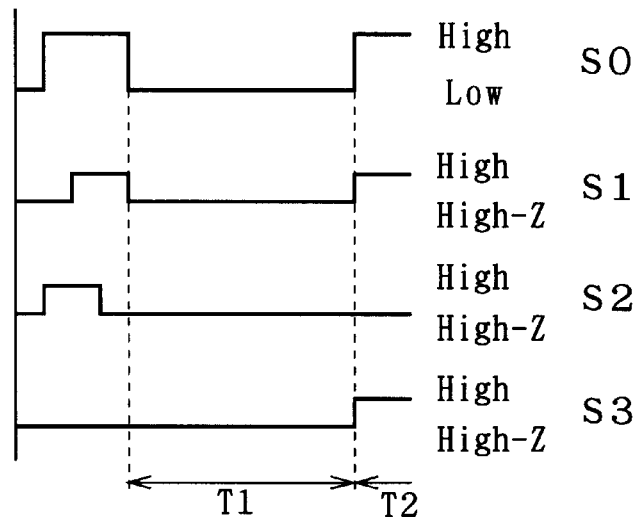
FIGS. 17 to 24 are time charts for describing a third example operations of the synchronous serial transfer apparatus according to the present invention.

FIG. 17 shows a timing chart regarding the signal S0 on the communication line TRL and output signals S1 to S3 from the communication apparatuses TR1 to TR3 during the idle signal output period. In FIG. 17, during the idle signal output period T1, the communication apparatuses TR1 to TR3 output "Low" and the signal S0 on the communication line TRL is "High-Z."

At the step ST2, the communication apparatuses TR1 to TR3 each compare, at each input/output compare part 16, an input signal from each input/output interface 17, namely the signal S0 on the communication line TRL ("Low" in this example), with a signal from each idle signal output part 2 ("Low" in this example). Based on whether the two signals coincide with each other, the communication apparatuses TR1 to TR3 judge whether the idle signal output period is continuing. If the idle signal output period is continuing, the step ST2 is repeated again. If the idle signal output period is over, the sequence proceeds to the next step ST3.

Figure 18:
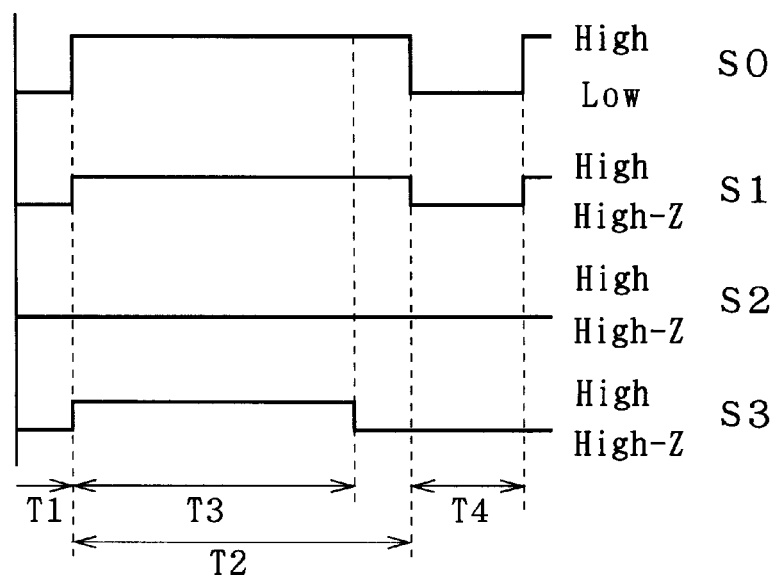

At the step ST3, in each one of the communication apparatuses TR1 to TR3, the control part 1 confirms whether there is a request for a communication. If the communication apparatuses TR1 and TR3 have requests for a communication, for example, the priority level determine signal output parts 4 of the communication apparatuses TR1 and TR3 each outputs the signal "High" to the communication line TRL only during a period which is set unique in advance to each communication apparatus (i.e., priority level determine signal output periods T2 and T3) (step ST4). FIG. 18 is a timing chart showing the signal S0 on the communication line TRL and the output signals S1 to S3 from the communication apparatuses TR1 to TR3 as they are at this stage. In this example, the communication apparatuses TR1 and TR3 both request to communicate with the communication apparatus TR2.

In FIG. 18, the communication apparatuses TR1 and TR3 output the signals "High" during the priority level determine signal output periods T2 and T3, respectively. As herein termed, the priority level determine signals are signals which are outputted to select one of the communication apparatuses which have requests for a communication so that a simultaneous communication by the plurality of communication apparatuses, i.e., collision of the signals on the communication line TRL is prevented. The longer the priority level determine signal output period is, the stronger the request of the associated priority level determine signal is (i.e., the higher the priority level is).

FIG. 18 shows the period T4 as well during which the signal S0 on the communication line TRL becomes "Low" after the priority level determine signal output periods terminate. The period T4 is shorter than the period T1.

In the communication apparatus TR2 which does not have a request for a communication, since the control part 1 does not recognize a request for a communication, the communication apparatus TR2 keeps its outputs in the "High-Z" state. Through the input/output compare part 16, the priority level determine signal detect part 5 detects whether the priority level determine signal is outputted to the signal S0 which is on the communication line TRL, i.e., whether the signal S0 is "High" (step ST12). If the priority level determine signal is outputted, the sequence proceeds to the step ST13. If the priority level determine signal is not outputted, the step ST1 and the subsequent steps are repeated.

On the other hand, the communication apparatuses TR1 and TR3 each compare, at each input/output compare part 16, its priority level determine signal with the signal S0 which is on the communication line TRL. When the priority level determine signal output period terminates and the output enters the "High-Z" state, if the signal S0 on the communication line TRL is "Low," the communication apparatuses TR1 and TR3 each recognizes, at each priority level determine signal detect part 5, that its request is allowed, i.e., it has acquired a priority right (step ST5). In this example, since the communication apparatus TR1 has a longer priority level determine signal output period than the communication apparatus TR3, the signal S0 becomes "Low" at the timing that the signal S1 enters the "High-Z" state. In short, a priority right is given to the communication apparatus TR1. Consequently, a communication between the communication apparatuses TR1 and TR2 is prioritized in this example. The communication apparatus TR1 is the transmission end while the communication apparatus TR2 is the receiving end.

After confirming the priority right, the communication apparatus TR1 maintains the period in which the output signal S1 is "High-Z" exactly during the predetermined period T4. At this stage, the signal S0 on the communication line TRL becomes "Low" only during the predetermined period T4.

Figure 19:
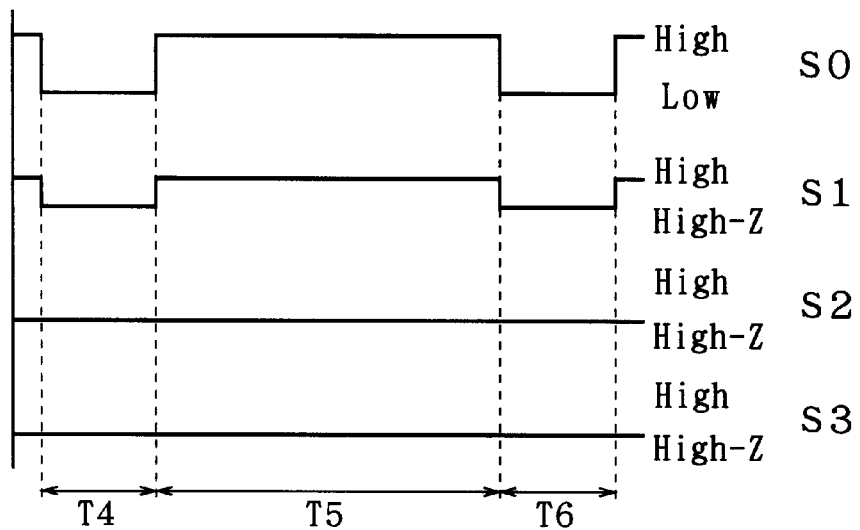

After the period T4, the communication apparatus TR1 outputs, at the transmission end address output part 6, "High" during the period which is set unique to the communication apparatus TR1 (transmission end address signal output period T5 in this example), as a transmission end address signal which expresses that the communication apparatus TR1 is the transmission end (step ST6). FIG. 19 is a timing chart showing the signal S0 on the communication line TRL and the output signals S1 to S3 from the communication apparatuses TR1 to TR3 as they are at this stage.

On the other hand, while maintaining the "High-Z" state, the communication apparatuses TR2 and TR3 each detect, at each transmission end address detect part 7 through each input/output compare part 16, that the transmission end is the communication apparatus TR1.

Detection of the transmission end is realized by detecting the length of the transmission end address signal output period T5 which is set unique to the communication apparatus TR1, namely, the period in which the signal S0 on the communication line TRL is "High" (step ST13), and thereafter comparing, by the respective transmission end address detect parts 7, the transmission end address signal output periods which are set unique in advance to the respective communication apparatuses with the transmission end address signal output period T5 unique to the communication apparatus TR1 which is detected at the step ST13 (step ST14).

In this example, since the communication apparatus TR1 is the transmission end, the lengths of the transmission end address signal output periods do not coincide with each other at the step ST14, and the sequence proceeds to the step ST16. However, if either the communication apparatus TR2 or TR3 is the transmission end, the sequence proceeds to the step ST15. Operations after proceeding to the step ST15 will be described in detail in relation to a fifth example of operations.

After the transmission end address signal output period T5 is over, the output signal S1 from the communication apparatus TR1 enters the "High-Z" state only during the period T6. At this stage, the signal S0 on the communication line TRL is "Low." The period T6 is shorter than the period T1.

Figure 20:
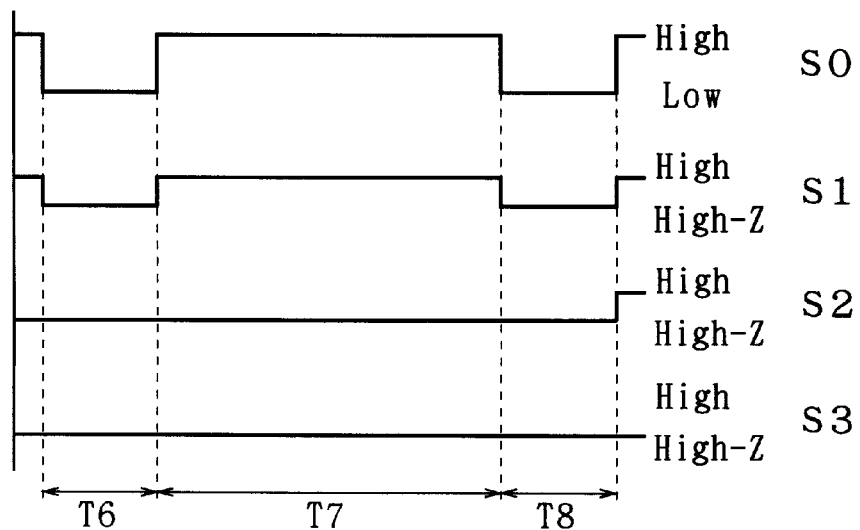

Following this, the communication apparatus TR1 outputs, at the receiving end address output part 8, the signal "High" exactly during a predetermined period (i.e., a receive address signal output period T7 in this example), as a receive address signal which represents an address of the receiving end (step ST7). A communication apparatus which has a priority right designates addresses of the transmission end and the receiving end, and such a communication apparatus is the communication apparatus TR1 in this example. FIG. 20 is a timing chart showing the signal S0 on the communication line TRL and the output signals S1 to S3 from the communication apparatuses TR1 to TR3 as they are at this stage.

On the other hand, while maintaining the "High-Z" state, the communication apparatuses TR2 and TR3 each detect, at each receiving end address detect part 9 through each input/output compare part 16, which is the receiving end.

Detection of the receiving end is realized by detecting the length of the receiving end address signal output period T7, namely, the period in which the signal S0 on the communication line TRL is "High" (step ST16), and thereafter comparing, by the respective receiving end address detect parts 9, the "High" periods expressing the addresses which are set unique to the respective communication apparatuses with the receiving end address signal output period T7 at the step ST17 which is shown in FIG. 4. In this example, the receiving end address signal output period T7 coincides with the "High" period expressing the address which is set unique to the communication apparatus TR2.

If either the communication apparatus TR2 or TR3 which does not have a priority right is the transmission end, the same operation as that at the step ST16 is performed at the step ST15, to thereby detect the length of the receiving end address signal output period T7. In this case, the communication apparatus TR2 or TR3 which is the transmission end proceeds to the step ST9 and executes a transmission. Operations in such a case will be described in detail in relation to the fifth example of operations.

After the receiving end address is outputted, the output signal S1 from the communication apparatus TR1 enters the "High-Z" state. At this stage, the signal S0 on the communication line TRL becomes "Low" during the predetermined period T8. The period T8 is from a point when the signal S1 enters the "High-Z" state until the communication apparatus TR2 starts outputting the receive clock. The period T8 is shorter than the period T1.

Once it is detected at the step ST17 that the receiving end is the communication apparatus TR2 based on coincidence of the addresses, after the period T8 terminates, the clock signal output part 10 of the communication apparatus TR2 starts outputting the receive clock (step ST18), whereby the data communication period T9 starts.

Figure 21:
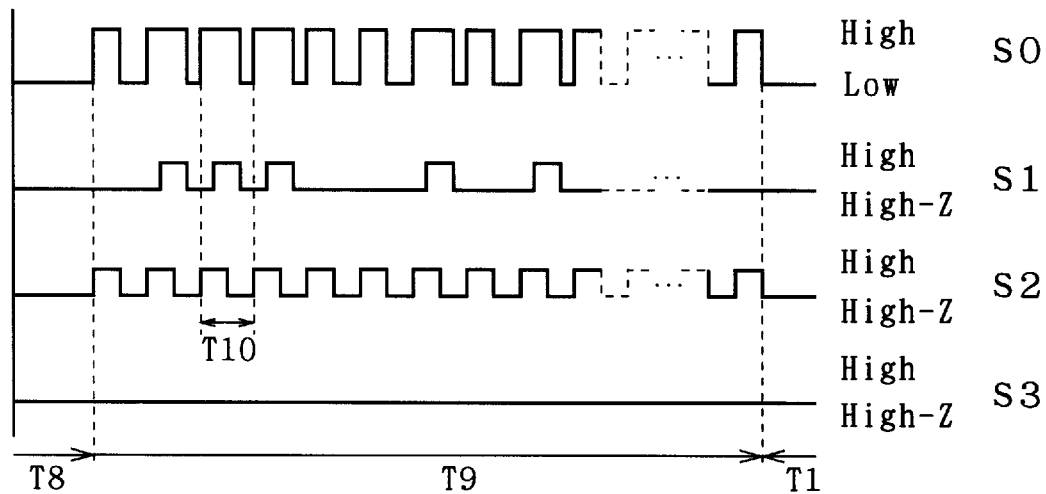
Figure 22:
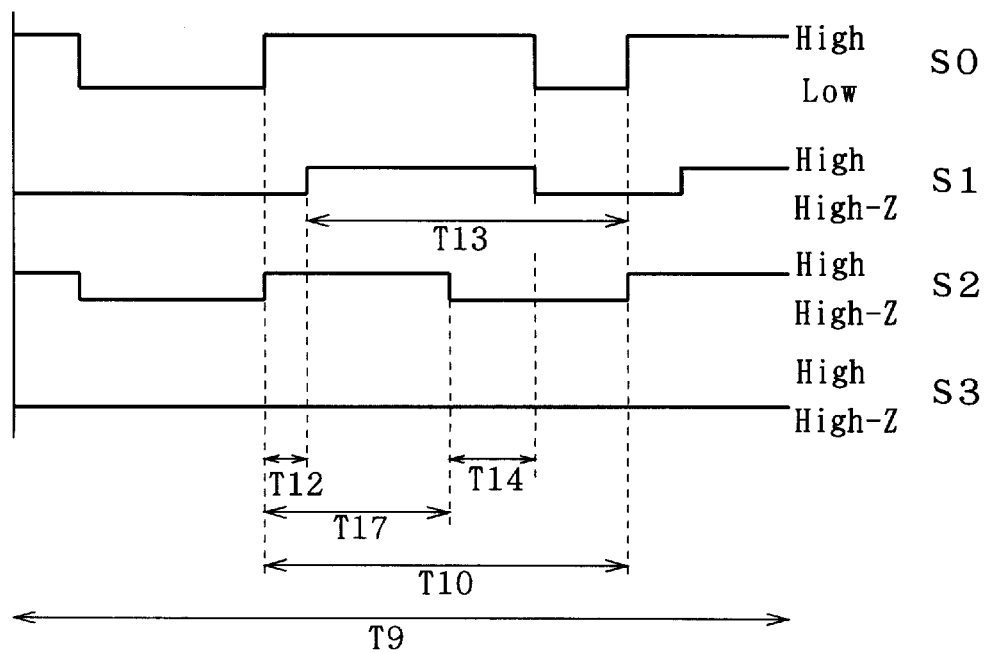

FIG. 21 is a timing chart showing the signal S0 on the communication line TRL and the output signals S1 to S3 from the communication apparatuses TR1 to TR3 as they are at this stage. FIG. 22 shows detailed timing at which the communication apparatus TR1 transmits data and detailed timing at which the communication apparatus TR2 takes in the data as shown in FIG. 21.

The communication apparatus TR1 which is the transmission end starts transmitting at the step ST8 of FIG. 4, and detects at the clock signal detect part 11 through the input/output compare part 16 that the signal S0 on the communication line TRL becomes "High" (step ST9). More precisely, as shown in FIG. 22, the communication apparatus TR1 detects a rise of the receive clock at a rise of the signal S0 on the communication line TRL.

During a period T17 which is a "High" period out of one cycle T10 of the receive clock, after the predetermined period T12 (i.e., transmission end data output setup period) since the fall of the receive clock, the transmission data output part 12 transmits data only during the predetermined period (i.e., transmission end data output period) T13 which is equal to or longer than (T11–T12) but is shorter than (T10–T12) (step ST10). In this case, the data transmitted from the communication apparatus TR1 is "High."

Regarding the signal from the transmission data output part 12 of the communication apparatus TR1, if the transmission data are the same as immediately preceding data, the transmission data convert part 13 outputs "High" but the transmission data convert part 13 outputs "Low" if the transmission data are different from the immediately preceding data. As a result, through the input/output interface 17, the signal "High" and the "High-Z" state are respectively outputted to the communication line TRL.

After the data output period T13, the signal "Low" is made "High-Z," that is, the communication line TRL is made "High-Z" state through the input/output interface 17. At this stage, T13=T17+T14–T12.

If the communication apparatus TR1 is a receiving end, for example, but is not a transmission end, the sequence switches to the operation at the step ST18 from the operation at the step ST8. If the communication apparatus TR1 is not a receiving end nor a transmission end but only designates a receiving end and a transmission end, the sequence returns to the operation at the step ST1. Operations in such a case will be described in detail in relation to the fifth example of operations.

The communication apparatus TR2 which is the receiving end detects a change of the signal S0 on the communication line TRL when its receive clock falls, and if the two signals coincides with each other, receives the data (step ST19).

More precisely, at the receive data detect part 14 through the input/output compare part 16, the communication apparatus TR2 detects whether the rise of the receive clock coincides with the rise of the signal S0 on the communication line TRL. This is necessary for the communication apparatus TR1 sets the communication line TRL open (i.e., "High-Z" state) before the communication apparatus TR2 receives the data.

The data are received in the predetermined period T14 (i.e., transmission end data output hold period) after a fall of the receive clock, that is, after the period T17 of FIG. 22 terminates. More particularly, if the signal S0 stays "High" at a fall of the receive clock (signal S2 in this example) as well, the receive data detect part 14 recognizes that the signal "High" is outputted by the communication apparatus TR1 as the signal S1, and the receive convert part 15 converts the signal into data which are the same as immediately preceding data and takes in the converted data.

If the signal S0 falls at the same timing that the signal S2 falls, the receive data detect part 14 recognizes that the signal "Low" is outputted by the communication apparatus TR1 as the signal S1, and the receive convert part 15 converts the signal into data which are different from the immediately preceding data and takes in the converted data. As initial value data, the received data have "0" or "1."

During the data communication period T9, the communication apparatus TR3 which is not relevant to the communication maintains the "High-Z" state. The period in which the receive clock (i.e., signal S2) is "High-Z" needs to be shorter than the period T1 in some cases.

In the communication apparatuses TR1 and TR2, the control part 1 confirms whether communication data is left remaining, every time one piece of data is transmitted (steps ST11 and ST20). If there is transfer data left remaining, the sequence returns to the step ST9 and the step ST18 to thereby repeat transfer of data. If there is no transfer data left remaining, the communication apparatus TR2 which is the receive end stops outputting the receive clock, so that the outputs from the communication apparatus TR1 which is the transmission end and the communication apparatus TR2 which is the receive end both become the "High-Z" state, and the sequence proceeds to the step ST1 to thereby render the signal S0 on the communication line TRL idle.

In the block B5, when the communication apparatus TR2 which is the receive end has a request to suspend receiving the data, outputting of the receive clock is suspended and the signal S2 is made "High-Z," whereby the request is satisfied.

Figure 23:
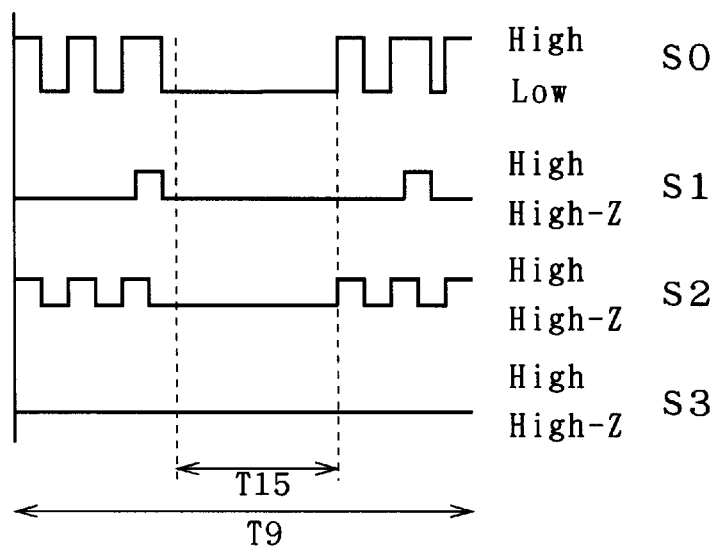

FIG. 23 is a timing chart showing the signal S0 on the communication line TRL and the output signals S1 to S3 from the communication apparatuses TR1 to TR3 as they are at this stage. The communication apparatus TR1 which is the transmission end detects the rise of the signal S0 on the communication line TRL and transmits the data, and therefore, if the receive clock which is outputted from the communication apparatus TR2 which is the receive end is maintained in the "High-Z" state, the signal S0 cannot become "High-Z" Since this prohibits the communication apparatus TR1 from detecting the rise of the signal S0 during the clock suspend period T15, the communication apparatus TR1 cannot transmit the data. As the communication apparatus TR2 starts outputting the clock again, the communication apparatus TR1 detects the rise of the clock and resumes the transmission of the data. To prevent the clock suspend period T15 from getting confused with the idle period T1, the period T15 is set shorter than the idle period T1.

It is when time needs be secured for the purpose of processing data on the receiving end that receipt of the data is to be suspended. Hence, software and a system are designed in such a manner that receipt of data will not be suspended for a long time.

Figure 24:
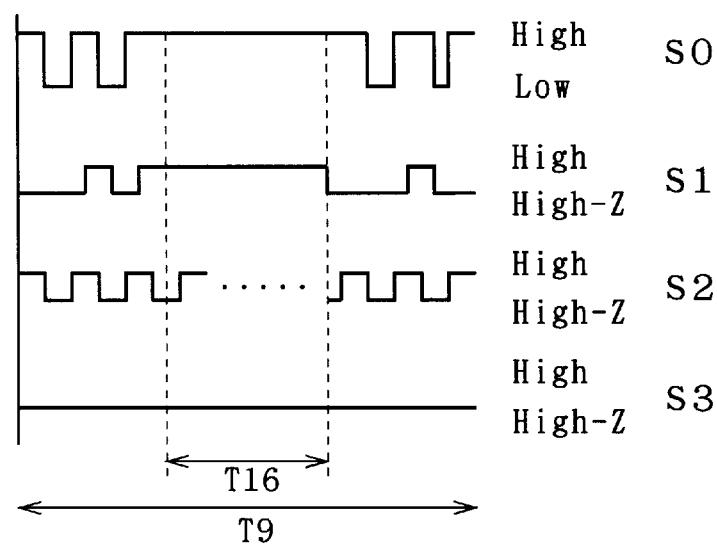

Further, in the block B5, when the communication apparatus TR1 which is the transmission end requests to suspend the transmission, the request is satisfied by maintaining the signal S1 in the "High" state. FIG. 24 is a timing chart showing the signal S0 on the communication line TRL and the output signals S1 to S3 from the communication apparatuses TR1 to TR3 as they are at this stage.

When the receive clock outputted by the communication apparatus TR2 rises, the communication apparatus TR2 which is the receiving end detects a change in the signal S0 on the communication line TRL and accordingly detects that there are transmission data. Hence, if the communication apparatus TR1 which is the transmission end keeps the output in the "High" state during the predetermined period (i.e., data transmission suspend period) T16, the signal SO does not change at the rise of the receive clock. Therefore, the communication apparatus TR2 which is the receiving end recognizes that the transmission is suspended. When the communication apparatus TR1 enters the "High-Z" state, the communication apparatus TR2 recognizes that the transmission is resumed.

<2-4. Fourth Example Of Operations>

A fourth example of operations of the synchronous serial transfer apparatus according to the present invention will be described with reference to FIGS. 17 to 20 and 25 to 28. In this example, the potential fixing apparatus VC has a structure, such as a pull-down resistor, which fixes a potential of the communication line TRL from the "High-Z" state to the "Low" state.

The input/output interface 17 has a function of converting a signal from the communication apparatus TR1 from the "Low" state to the "High-Z" state when the signal from the communication apparatus TR1 is outputted to the communication line TRL. Further, the transmission data convert part 13 has a function of outputting a signal "High" when there is a change in data but outputting a signal "Low" when there is no change in data. The receive convert part 15 has a conversion function of converting a signal "Low" into data which are the same as immediately preceding data and a signal "High" into data which are different from the immediately preceding data (See FIG. 32).

In this example, since the operations in the blocks B1 to B4 which are shown in FIG. 3 are similar to the third example of operations described with reference to FIGS. 17 to 20, a redundant description will be simply omitted.

Once it is detected at the step ST17 which is shown in FIG. 4 that the receiving end is the communication apparatus TR2 based on coincidence of the addresses, after the period T8 terminates, the communication apparatus TR2 starts outputting the receive clock from the clock signal output part 10 (step ST18), whereby the data communication period T9 starts.

Figure 25:
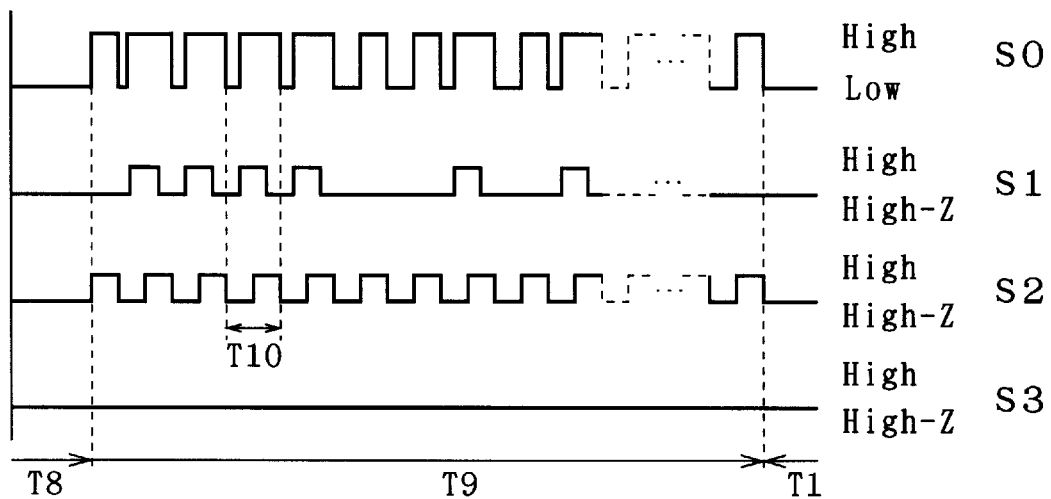
FIGS. 25 to 28 are time charts for describing a fourth example operations of the synchronous serial transfer apparatus according to the present invention.
Figure 26:
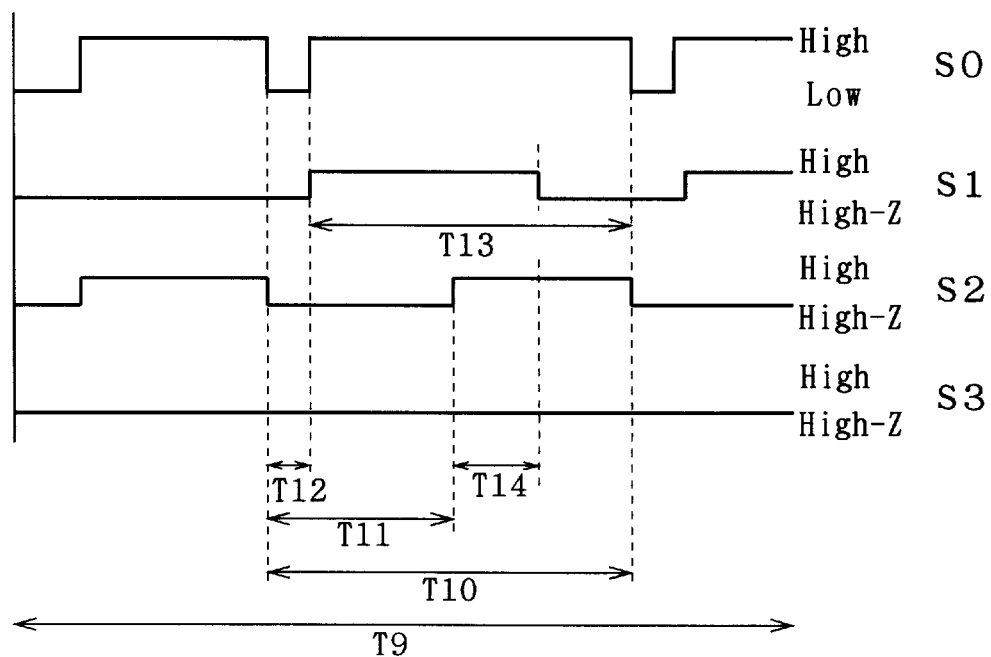

FIG. 25 is a timing chart showing the signal S0 on the communication line TRL and the output signals S1 to S3 from the communication apparatuses TR1 to TR3 as they are at this stage. FIG. 26 shows detailed timing at which the communication apparatus TR1 transmits data and detailed timing at which the communication apparatus TR2 takes in the data as shown in FIG. 25.

The communication apparatus TR1 which is the transmission end starts transmitting at the step ST8 of FIG. 4, and detects at the clock signal detect part 11 through the input/output compare part 16 that the signal S0 on the communication line TRL becomes "High" (step ST9). More precisely, as shown in FIG. 26, the communication apparatus TR1 detects a fall of the receive clock at a fall of the signal S0 on the communication line TRL.

During the period T17 which is a "Low" period out of one cycle T10 of the receive clock, after the predetermined period T12 (i.e., transmission end data output setup period) since the rise of the receive clock, the transmission data output part 12 transmits data only during the predetermined period (i.e., transmission end data output period) T13 which is equal to or longer than (T17–T12) but is shorter than (T10–T12) (step ST10). In this case, the data transmitted from the communication apparatus TR1 is "High."

Regarding the signal from the transmission data output part 12 of the communication apparatus TR1, if the transmission data are the same as immediately preceding data, the transmission data convert part 13 outputs "Low" but the transmission data convert part 13 outputs "High" if the transmission data are different from the immediately preceding data. As a result, through the input/output interface 17, the "High-Z" state and the signal "High" are respectively outputted to the communication line TRL.

After the data output period T13, the signal "Low" is made "High-Z," that is, the communication line TRL is made "High-Z" through the input/output interface 17. At this stage, T13=T11+T14–T12.

If the communication apparatus TR1 is a receiving end, for example, but is not a transmission end, the sequence switches to the operation at the step ST18 from the operation at the step ST8. If the communication apparatus TR1 is not a receiving end nor a transmission end but only designates a receiving end and a transmission end, the sequence returns to the operation at the step ST1. Operations in such a case will be described in detail in relation to the fifth example of operations.

The communication apparatus TR2 which is the receiving end detects a change of the signal S0 on the communication line TRL when its receive clock falls, and if the two signals coincides with each other, receives the data (step ST19).

More precisely, at the receive data detect part 14 through the input/output compare part 16, the communication apparatus TR2 detects whether the fall of the receive clock coincides with the fall of the signal S0 on the communication line TRL. This is an operation which is necessary for the communication apparatus TR2 to confirm that the communication apparatus TR1 sets the communication line TRL open (i.e., "High-Z" state) and to accordingly set the signal S2 "Low" once before receiving the data.

The data are received in the predetermined period T14 (i.e., transmission end data output hold period) after a rise of the receive clock, that is, after the period T11 of FIG. 26 terminates. More particularly, if the signal S0 stays "High" at a fall of the receive clock (signal S2 in this example) as well, the receive data detect part 14 recognizes that the signal "High" is outputted by the communication apparatus TR1 as the signal S1, and the receive convert part 15 converts the signal into data which are different from immediately preceding data and takes in the converted data.

If the signal S0 rises at the same timing that the signal S2 rises, the receive data detect part 14 recognizes that the signal "Low" is outputted by the communication apparatus TR1 as the signal S1, and the receive convert part 15 converts the signal into data which are the same as the immediately preceding data and takes in the converted data. As initial value data, the received data have "0" or "1."

During the data communication period T9, the communication apparatus TR3 which is not relevant to the communication maintains the "High-Z" state. The period in which the receive clock (i.e., signal S2) is "High-Z" needs to be shorter than the period T1 in some cases.

In the communication apparatuses TR1 and TR2, the control part 1 confirms whether communication data is left remaining, every time one piece of data is transmitted (steps ST11 and ST20). If there is transfer data left remaining, the sequence returns to the step ST9 and the step ST18 to thereby repeat transfer of data. If there is no transfer data left remaining, the communication apparatus TR2 which is the receive end stops outputting the receive clock, so that the outputs from the communication apparatus TR1 which is the transmission end and the communication apparatus TR2 which is the receive end both become the "High-Z" state, and the sequence proceeds to the step ST1 to thereby render the signal S0 on the communication line TRL idle.

In the block B5, when the communication apparatus TR2 which is the receive end has a request to suspend receiving the data, outputting of the receive clock is suspended and the "High" state is maintained, whereby the request is satisfied.

Figure 27:
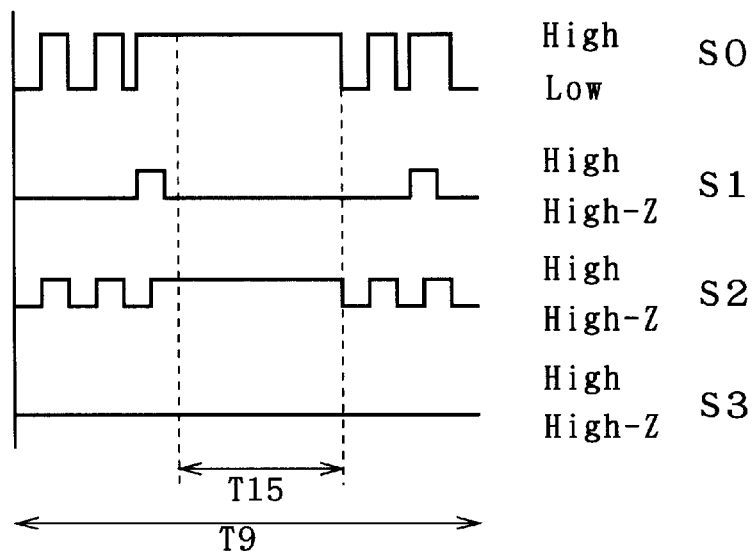

FIG. 27 is a timing chart showing the signal S0 on the communication line TRL and the output signals S1 to S3 from the communication apparatuses TR1 to TR3 as they are at this stage. The communication apparatus TR1 which is the transmission end detects the fall of the signal S0 on the communication line TRL and transmits the data, and therefore, if the receive clock which is outputted from the communication apparatus TR2 which is the receive end is maintained in the "High" state, the signal S0 cannot become "Low." Since this prohibits the communication apparatus TR1 from detecting the fall of the signal S0 during the clock suspend period T15, the communication apparatus TR1 cannot transmit the data. As the communication apparatus TR2 starts outputting the clock again, the communication apparatus TR1 detects the fall of the clock and resumes the transmission of the data. To prevent the clock suspend period T15 from getting confused with the idle period T1, the period T15 is set shorter than the idle period T1.

It is when time needs be secured for the purpose of processing data on the receiving end that receipt of the data is to be suspended. Hence, software and a system are designed in such a manner that receipt of data will not be suspended for a long time.

Figure 28:
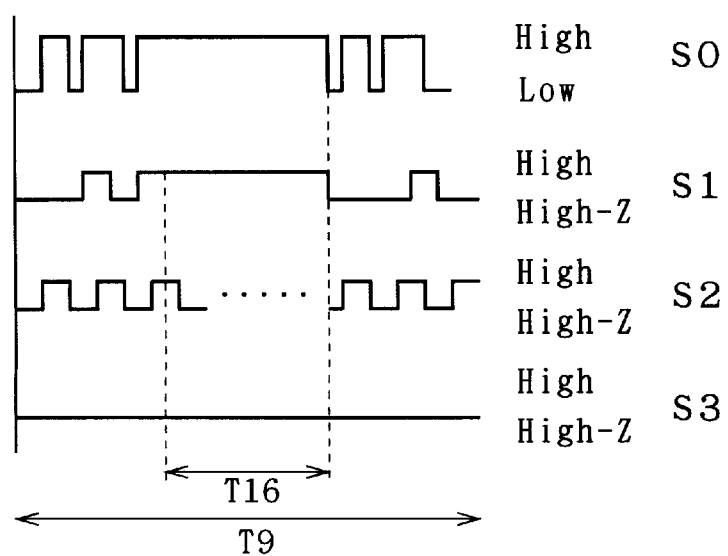

Further, in the block B5, when the communication apparatus TR1 which is the transmission end requests to suspend the transmission, the request is satisfied by maintaining the signal S1 in the "High" state. FIG. 28 is a timing chart showing the signal S0 on the communication line TRL and the output signals S1 to S3 from the communication apparatuses TR1 to TR3 as they are at this stage.

When the receive clock outputted by the communication apparatus TR2 falls, the communication apparatus TR2 which is the receiving end detects a change in the signal S0 on the communication line TRL and accordingly detects that there are transmission data. Hence, if the communication apparatus TR1 which is the transmission end keeps the output in the "High" state during the predetermined period (i.e., data transmission suspend period) T16, the signal S0 does not change at the fall of the receive clock. Therefore, the communication apparatus TR2 which is the receiving end recognizes that the transmission is suspended. When the communication apparatus TR1 enters the "High-Z" state, the communication apparatus TR2 recognizes that the transmission is resumed.

<2-5. Fifth Example Of Operations>

A fifth example of operations of the synchronous serial transfer apparatus according to the present invention will be described with reference to FIGS. 3, 4 and 29.

Figure 29:
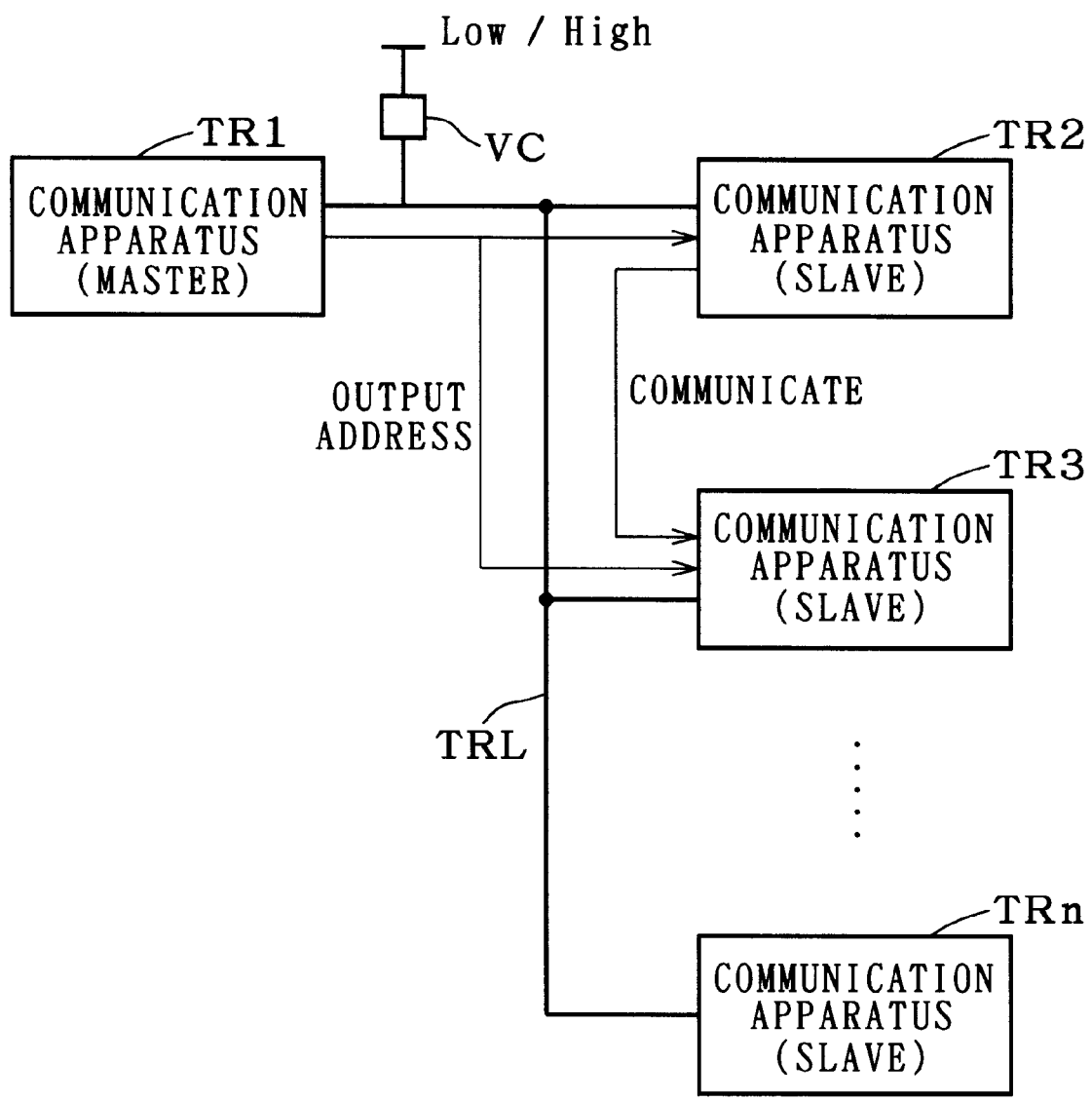
FIG. 29 is a time chart for describing a fifth example operations of the synchronous serial transfer apparatus according to the present invention.

FIG. 29 is a conceptual view for describing a master/slave operation in the synchronous serial transfer apparatus which is shown in FIG. 1. FIG. 29 is similar to FIG. 1 in that a plurality of communication apparatuses (TR1 to TRn) are connected parallel to each other by one communication line TRL and that the potential fixing apparatus VC is connected to the communication line TRL.

However, in the synchronous serial transfer apparatus which is shown in FIG. 29, the communication apparatus TR1 is a master apparatus and the communication apparatuses TR2 to TRn are slave apparatuses.

A master/slave operation is an operation in which a master apparatus instructs a transmission end and a receiving end so that a communication between slave apparatuses is controlled.

Now, a master/slave operation using the synchronous serial transfer apparatus according to the present invention will be described with reference to FIGS. 3 and 4.

In this example, the communication apparatus TR1 instructs such addresses which make the communication apparatus TR2 a transmission end and the communication apparatus TR3 a receiving end.

The operations at the steps ST1 and ST2 shown in FIG. 3 are similar to those described in relation to the first to the fourth examples of operations, and therefore, will not be described. At the step ST3, it is confirmed that the communication apparatus TR1 has a request for a communication, and the communication apparatuses TR2 and TR3 proceed to the step ST12.

On the other hand, the communication apparatus TR1 outputs, at the priority level determine signal output part 4, a predetermined signal to the communication line TRL only during periods which are set unique to the respective communication apparatuses (i.e., priority level determine signal output periods) (step ST4).

At the step ST12, the communication apparatuses TR2 and TR3, at each priority level determine signal detect part 5 through each input/output compare part 16, detect whether the priority level determine signal is outputted to the signal S0 on the communication line TRL. If the priority level determine signal is outputted, the communication apparatuses TR2 and TR3 proceed to the step ST13. If the priority level determine signal is not outputted, the communication apparatuses TR2 and TR3 repeat the step ST1 and the subsequent steps.

On the other hand, the communication apparatus TR1 compares, at the input/output compare part 16, its priority level determine signal with the signal S0 on the communication line TRL, and confirms whether a priority right is given to the communication apparatus TR1 (step ST5). In this example, since the communication apparatus TR1 is a master apparatus, the communication apparatus TR1 always acquires a priority right.

As a transmission end address signal which expresses that the communication apparatus TR2 is the transmission end, the communication apparatus TR1 outputs, at the transmission end address output part 6, a predetermined signal only during a period which is set unique to the communication apparatus TR2 (transmission end address signal output period) (step ST6).

Following this, as a receiving end address signal which expresses that the communication apparatus TR3 is the receiving end, the communication apparatus TR1 outputs, at the receiving end address output part 8, a predetermined signal only during a period which is set unique to the communication apparatus TR3 (receiving end address signal output period) (step ST7).

Since the communication apparatus TR1 does not transmit nor receive, in preparation for the next master/slave operation, the communication apparatus TR1 proceeds to the step ST1 (step ST8).

On the other hand, the communication apparatuses TR2 and TR3 receive the receiving end address signal at the respective input/output compare parts 16, and detects at the respective transmission end address detect parts 7 that the communication apparatus TR2 is the transmission end.

The transmission end is detected as the length of the transmission end address signal output period outputted by the communication apparatus TR1 is detected (step ST13) and compared by the respective transmission end address detect parts 7 with the transmission end address signal output periods which are set unique to the respective communication apparatuses (step ST14).

In this example, since the transmission end address signal is outputted so that the communication apparatus TR2 is the transmission end, the lengths of the transmission end address signal output periods coincide within the communication apparatus TR2 at the step ST14, and therefore, the communication apparatus TR2 proceeds to the step ST15. At the step ST15, the length of the transmission end address signal output period outputted by the communication apparatus TR1 is detected.

Following this, the communication apparatus TR2 proceeds to the step ST9 which is shown in FIG. 4 to perform the transmitting operation at the step ST9 and the subsequent steps. The transmitting operation at the step ST9 and the subsequent steps is similar to those described in relation to the first to the fourth examples of operations, and therefore, will not be described.

On the other hand, the communication apparatus TR3 proceeds to the step ST16, to detect the receiving end at the receiving end address detect part 9 through the input/output compare part 16.

The receiving end is detected as the length of the receiving end address signal output period outputted by the communication apparatus TR1 is detected (step ST16) and compared by the receiving end address detect part 9 with the receiving end address signal output period which is set unique to the communication apparatus TR3 at the step ST17 which is shown in FIG. 4.

In this example, since the receiving end address signal is outputted so that the communication apparatus TR3 is the receiving end, the lengths of the receiving end address signal output periods coincide within the communication apparatus TR3 at the step ST17, and therefore, the communication apparatus TR3 proceeds to the step ST18 to perform the receiving operation at the step ST18 and the subsequent steps. The receiving operation at the step ST18 and the subsequent steps is similar to those described in relation to the first to the fourth examples of operations, and therefore, will not be described.

As described above, as the master apparatus instructs the addresses of the slave apparatuses which are involved in a communication, it is possible to communicate data directly between the slave apparatuses without using the master apparatus.

<3. Modifications>

Figure 30:
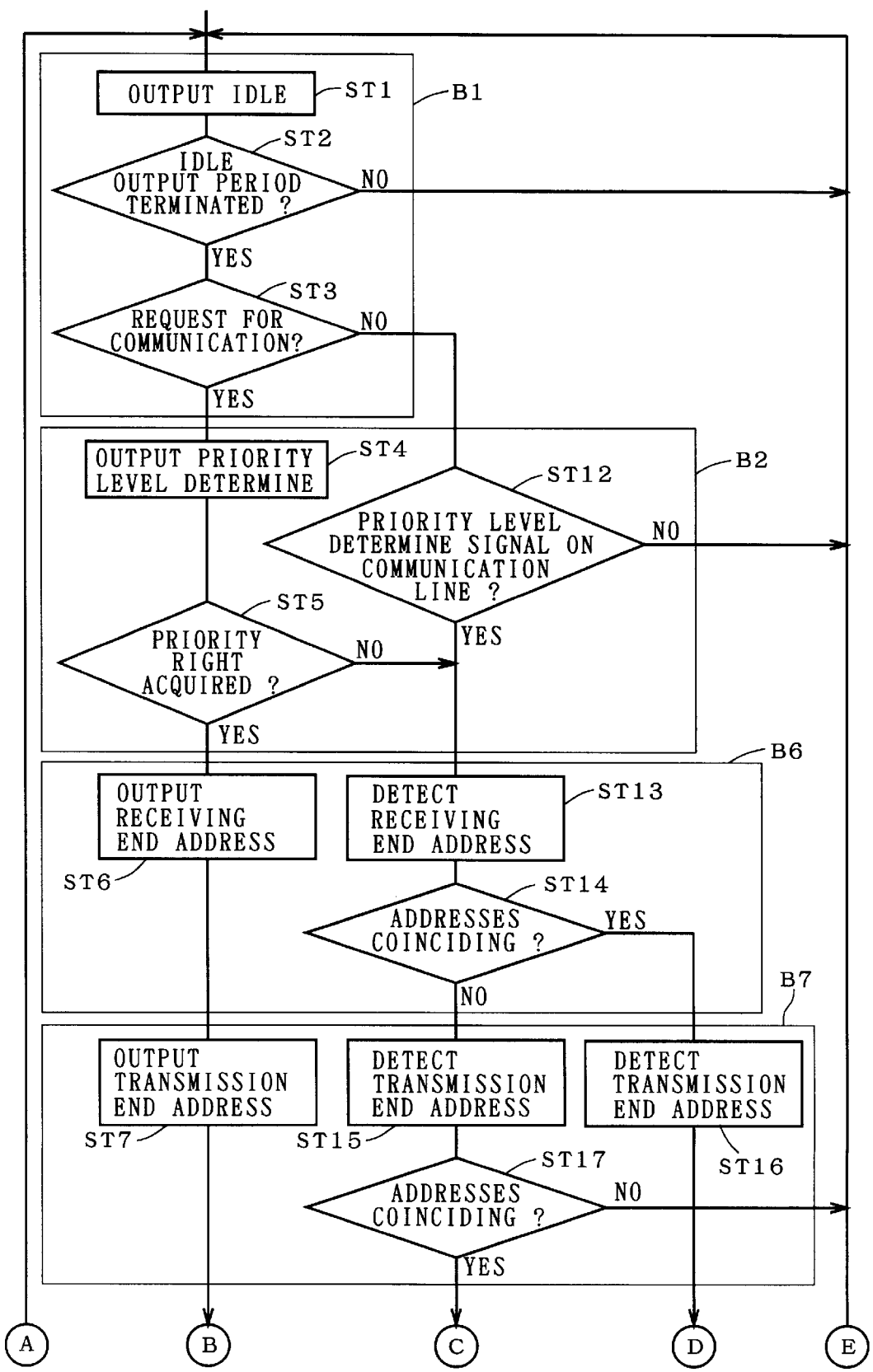
FIGS. 30 and 31 are flowcharts for describing a modification of the synchronous serial transfer apparatus according to the present invention.
Figure 31:
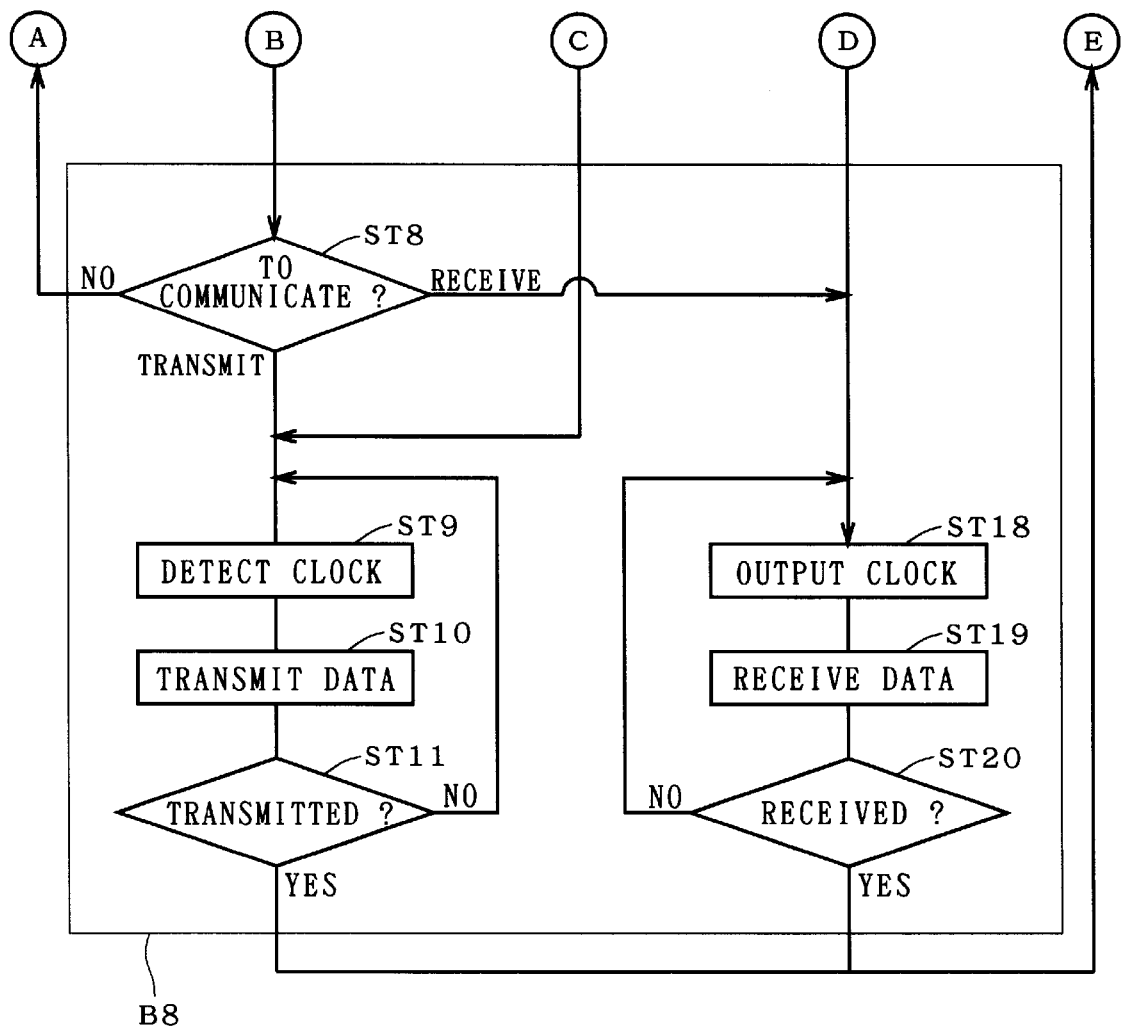
Figure 35:
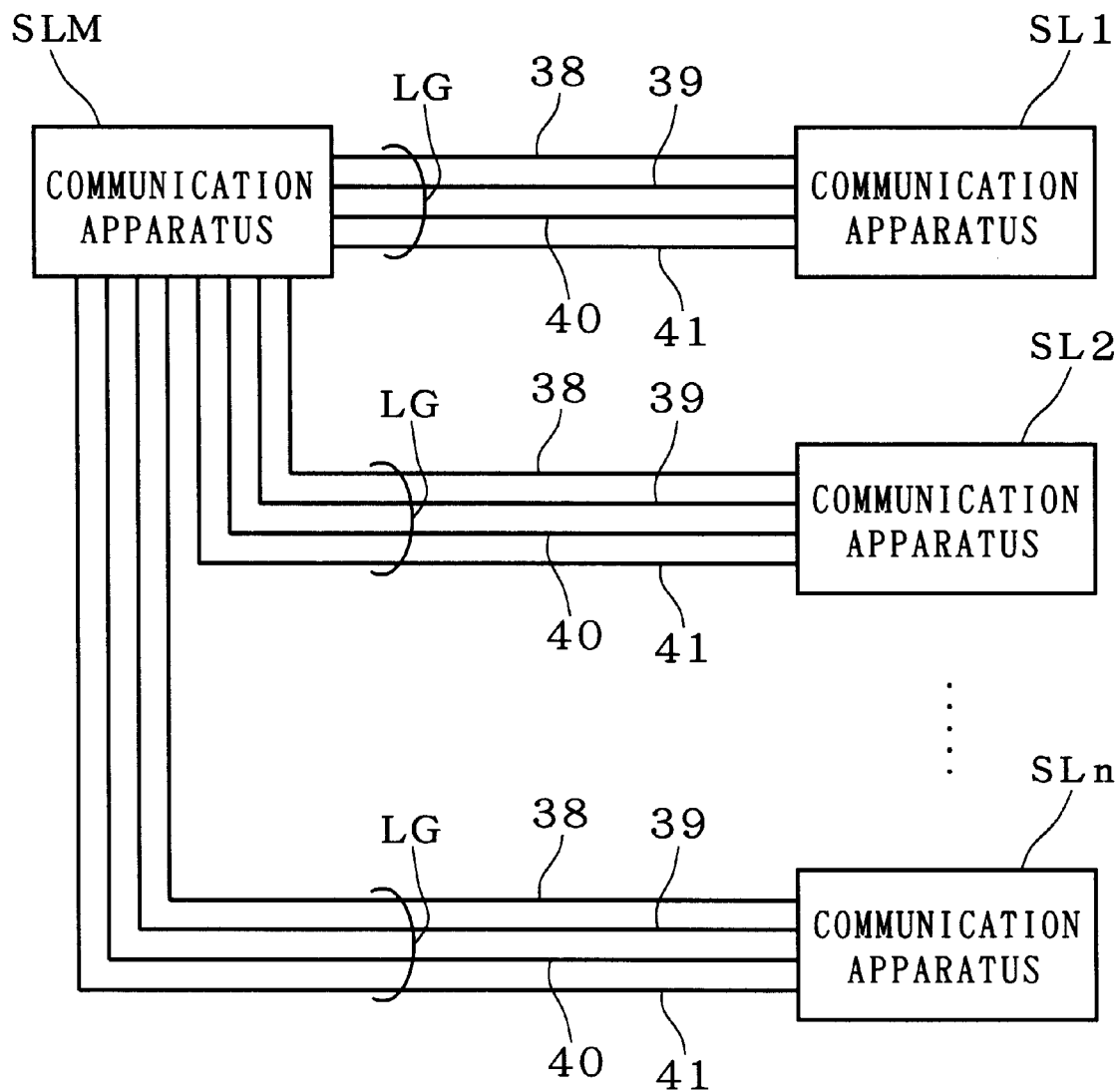
FIG. 35 is a diagram showing for describing a structure of a conventional synchronous serial transfer apparatus.

Although the foregoing has described the synchronous serial transfer apparatus according to the preferred embodiment of the present invention in relation to the first to the fifth examples of operations while referring to the flowcharts in FIGS. 3 and 4, FIGS. 3 and 4 may be a structure in which the transmission end address and the receiving end address are outputted in the reverse order and the transmission end address and the receiving end address are detected in the reverse order as shown in FIGS. 30 and 31.

FIGS. 30 and 31 are flowcharts showing operations of communication apparatuses, and are linked to each other at points A to E.

In FIG. 30, steps ST1 to ST3 will be referred to as a block B1, steps ST4, ST5 and ST12 will be referred to as a block B2, steps ST6, ST13 and ST14 will be referred to as a block B6, and steps ST and ST15 to ST17 will be referred to as a block B7. In FIG. 31, steps ST8 to ST1 and ST18 to ST20 will be referred to as a block B8.

In FIG. 30, the blocks B1 and B2 are similar to FIG. 3, and therefore, will not be described.

After confirming a priority right, as the receiving end address signal indicating the receiving end, the communication apparatus TR1, at the receiving end address output part 8, a predetermined signal only during a period which is set unique to the communication apparatus TR2 (receiving end address signal output period) (step ST6).

On the other hand, the communication apparatuses TR2 and TR3, at each input/output compare part 16, detect which is the receiving end.

The receiving end is detected as the length of the receiving end address signal output period outputted by the communication apparatus TR1 is detected (step ST13) and compared by the respective receiving end address detect parts 9 with periods expressing addresses which are set unique to the respective communication apparatuses at the step ST14. In this example, since the communication apparatus TR2 is the receiving end, the communication apparatus TR2 proceeds to the step ST16 and the communication apparatus TR3 proceeds to the step ST15.

As the transmission end address signal indicating the transmission end, at the transmission end address output part 6, the communication apparatus TR1 outputs a predetermined signal only during a period which is set unique to the communication apparatus TR1 (transmission end address signal output period) (step ST7).

The communication apparatuses TR2 and TR3 detect the length of the transmission end address signal output period which is set unique to the communication apparatus TR1, respectively at the steps ST16 and ST15. The communication apparatus TR2 then proceeds to the step ST18 to perform the receiving operation. The receiving operation at the step ST18 and the subsequent steps is similar to those described with reference to FIG. 4, and therefore, will not be described.

On the other hand, at the step ST17, the communication apparatus TR3 compares, at the transmission end address detect part 7 through the input/output compare part 16, the length of the transmission end address signal output period which is set unique to the communication apparatus TR1 with the length of the transmission end address signal output period which is set unique to the communication apparatus TR3. In this example, since the communication apparatus TR1 is the transmission end, the lengths of the transmission end address signal output periods do not coincide with each other at the step ST17, so that the communication apparatus TR3 proceeds to the step ST1. However, if the communication apparatus TR3 is the transmission end, the communication apparatus TR3 proceeds to the step ST9 to perform the transmitting operation. The operation in this case has already been described in relation to the fifth example of operations, and therefore, will not be described.

In addition, with respect to the first to the fourth examples of operations of the synchronous serial transfer apparatus according to the present invention described above, the foregoing has described only two patterns of relationships as the relationship between the signal from the transmission data convert part 13 and the output from the input/output interface 17 and the relationship between the output from the input/output interface 17 and the signal on the communication line TRL. However, there are two patterns of relationships as the relationship between the signal from the transmission data convert part 13 and the output from the input/output interface 17 as shown in FIG. 33, while there are two patterns of relationships as the relationship between the output from the input/output interface 17 and the signal on the communication line TRL as shown in FIG. 34, which amounts to four patterns in total. Needless to mention, the present invention is applicable to the remaining two patterns which were not described in the first to the fourth examples of operations.

Further, the first to the fourth examples of operations of the synchronous serial transfer apparatus according to the present invention described above are examples where the potential fixing apparatus VC has a resistor for the purpose of pull-up and pull-down. Although a resistor element may be used as this resistor, a transistor may be used of course.

Further, the foregoing has described the synchronous serial transfer apparatus according to the present invention in relation to a case where there are a plurality of communication apparatuses and there are a plurality of combinations. However, where there is only one combination for a communication, that is, in the case of a synchronous serial transfer apparatus which is formed by two communication apparatuses, operations such as outputting and detection of the address signals and outputting and detection of the priority level signal are not necessary. Instead, the synchronous serial transfer apparatus only has to have a structure in which one communication apparatus transmits data to the other communication apparatus while superimposing the data over the clock signal.

<4. Characteristic Effects>

In the synchronous serial transfer apparatus according to the present invention described above, the communication apparatuses each have the function of outputting a priority level of a communication of data and the function of detecting the priority level, and the communication apparatuses communicate data in accordance with the priority level. In addition, the communication apparatuses have the functions of outputting and detecting addresses which are set unique to the respective communication apparatuses, and a transmission end and a receiving end are designated by the addresses. When outputs from the communication apparatuses are in a high impedance condition, by means of the potential fixing apparatus which is disposed on the communication line and which fixes a potential on the communication line to "High" or "Low," data are transmitted as they are superimposed on the clock signal and received in accordance with the clock signal. Thus, it is not necessary to dispose data transmission lines, data receive lines, clock lines and control signal lines separately. Rather, by means of only the communication line which serves as all such lines, it is possible to perform a synchronous serial transfer to the plurality of communication apparatuses.

In addition, by designating a transmission end and a receiving end with the addresses, it is possible to optionally set the transmission end and the receiving end, so that in a master/slave operation, as a master apparatus instructs addresses of slave apparatuses which are involved in a communication, data are communicated directly between the slave apparatuses without using the master apparatus.

While the invention has been described in detail, the foregoing description is in all aspects illustrative and not restrictive. It is understood that numerous other modifications and variations can be devised without departing from the scope of the invention.

We claim:

1. A synchronous serial transfer apparatus for performing a synchronous serial transfer of data, comprising:

a plurality of communication apparatuses for transmitting and receiving said data; and a communication line which is formed by one line which connects said plurality of communication apparatuses parallel to each other, wherein each one of said plurality of communication apparatuses comprises an interface part for outputting a high impedance state to said communication line to replace a first potential and outputting a second potential as it is to said communication line, said second potential being complementary to said first potential.

2. The synchronous serial transfer apparatus of claim 1, further comprising a potential fixing apparatus which is connected to said communication line and which fixes a potential on said communication line to said first potential when all outputs of said plurality of communication apparatuses are in said high impedance state.

3. The synchronous serial transfer apparatus of claim 2, wherein each one of said plurality of communication apparatuses comprises:

a clock signal outputting part for outputting a clock signal which defines timing of transmitting and receiving said data;

a clock signal detecting part for detecting timing of a rise or a fall of said clock signal;

a data outputting part for superimposing said data over said clock signal and outputting said data as transmission data; and a data detecting part for detecting whether said transmission data have said first potential or said second potential at the timing of a rise or a fall of said clock signal which is detected by said clock signal detecting part, to thereby detect said data from said transmission data.

4. The synchronous serial transfer apparatus of claim 2, wherein said first potential is "High," and said potential fixing apparatus comprises pull-up means for fixing a potential on said communication line to "High."

5. The synchronous serial transfer apparatus of claim 2, wherein said first potential is "Low," and said potential fixing apparatus comprises pull-down means for fixing a potential on said communication line to "Low."

6. The synchronous serial transfer apparatus of claim 3, wherein each one of said plurality of communication apparatuses further comprises:

an idle signal outputting part for outputting an idle signal which indicates to other ones of said plurality of communication apparatuses that each one of said plurality of communication apparatuses is an idle state where no communication is executed; and an idle signal detecting part for detecting that said other ones of said plurality of communication apparatuses are in said idle state, in response to said idle signal which is outputted by each one of said other ones of said plurality of communication apparatuses.

7. The synchronous serial transfer apparatus of claim 3, wherein different addresses are set to said plurality of communication apparatuses so that said plurality of communication apparatuses are distinguished from each other, and
- a priority level for an exclusive use of said communication line is assigned to each one of said plurality of communication apparatuses, for a communication of said data,
- said plurality of communication apparatuses each further comprises:
- an address signal outputting part for outputting an address signal which indicates said addresses;
- an address signal detecting part for detecting said address signal;
- a priority level signal outputting part for outputting a priority level signal which indicates said priority level; and
- a priority level signal detecting part for detecting said priority level signal.

8. The synchronous serial transfer apparatus of claim 7, wherein said plurality of communication apparatuses each further comprises:
- an idle signal outputting part for outputting an idle signal which indicates to other ones of said plurality of communication apparatuses that each one of said plurality of communication apparatuses is an idle state where no communication is executed; and
- an idle signal detecting part for detecting that said other ones of said plurality of communication apparatuses are in said idle state, in response to said idle signal which is outputted by each one of said other ones of said plurality of communication apparatuses.

9. The synchronous serial transfer apparatus of claim 7, wherein said address signal outputting part has a function of outputting said second potential as said address signal only during a predetermined address signal output period, and
- said address signal detecting part has a function of detecting whether a period of said second potential on said communication line is the same as an address signal output period which is set to said address signal detecting part, and a communication operation is performed only when the period of said second potential on said communication line coincides with said address signal output period which is set to said address signal detecting part.

10. The synchronous serial transfer apparatus of claim 7, wherein said priority level signal outputting part has a function of outputting said second potential as said priority level signal only during a predetermined priority level signal output period, and
- said priority level signal detecting part has a function of detecting whether a period of said second potential on said communication line is the same as a priority level signal output period which is set to said address signal detecting part, and a communication operation is performed with a priority when the period of said second potential on said communication line coincides with said priority level signal output period which is set to said address signal detecting part.

11. The synchronous serial transfer apparatus of claim 9, wherein said address signal outputting part has a function of outputting a transmission end address signal which indicates a transmission end of said data, and a function of outputting a receiving end address signal which indicates a receiving end of said data, said address signal detecting part has a function of receiving said transmission end address signal and detecting whether said transmission end address signal coincides with said address signal output period which is set to said address signal detecting part, and said address signal detecting part judges that said address signal detecting part is a transmission end of said data when said transmission end address signal coincides with said address signal output period which is set to said address signal detecting part, and said address signal detecting part also has a function of receiving said receiving end address signal and detecting whether said receiving end address signal coincides with said address signal output period which is set to said address signal detecting part, and said address signal detecting part judges that said address signal detecting part is a receiving end of said data when said receiving end address signal coincides with said address signal output period which is set to said address signal detecting part.

12. A synchronous serial transfer method for performing a synchronous serial transfer of data between a plurality of communication apparatuses through a communication line which is formed by one line,
- wherein said plurality of communication apparatuses each have a function of outputting a high impedance state to said communication line to replace a first potential and outputting a second potential as it is to said communication line, said second potential being complementary to said first potential, and
- a potential fixing apparatus is connected to said communication line, said potential fixing apparatus fixing a potential on said communication line to said first potential when all outputs of said plurality of communication apparatuses are in a high impedance state,
- said method comprising the steps of:
  - (a) outputting a clock signal in which said second potential and said high impedance state is periodically given, from a receiving end communication apparatus which is to receive said data out of said plurality of communication apparatuses;
  - (b) outputting said data as they as superimposed over said clock signal, from a transmission end communication apparatus which is to transmit said data out of said plurality of communication apparatuses so that said potential fixing apparatus creates transmission data which are formed by said first and said potentials; and
  - (c) detecting by said transmission end communication apparatus whether said transmission data have said first potential or said second potential, at timing of a rise or a fall of said clock signal.

13. The synchronous serial transfer method of claim 12, wherein different addresses are set to said plurality of communication apparatuses so that said plurality of communication apparatuses are distinguished from each other, and priority levels for an exclusive use of said communication line are assigned to said plurality of communication apparatuses, for a communication of said data, and
- said method further comprising the steps of:
  - (d) comparing said priority levels which are assigned said plurality of communication apparatuses, by communication apparatuses which have requests for a communication out of said plurality of communication apparatuses so that a communication apparatus which has the highest priority level acquires a priority right to exclusively use said communication line;

(e) outputting a receiving end address signal which indicates said receiving end communication apparatus, by said communication apparatus acquiring said priority right out of said communication apparatuses which have requests for a communication; and (f) comparing said receiving end address signal with said addresses which are set unique to said plurality of communication apparatuses, by communication apparatuses other than said communication apparatus acquiring said priority right out of said plurality of communication apparatuses so that a communication apparatus whose address coincides with said receiving end address signal is recognized as said receiving end communication apparatus.

14. The synchronous serial transfer method of claim 13, wherein said communication apparatus acquiring said priority right is a communication apparatus which only outputs said transmission end address signal and said receiving end address signal, said step (e) includes a step (e-1) in which said second potential is outputted only during an address signal output period which is assigned, as said transmission end address signal, and said step (f) includes a step (f-1) in which out of said plurality of communication apparatuses, communication apparatuses other than said communication apparatus acquiring said priority right detect whether a period of said second potential on said communication line coincides with said address signal output period which is assigned to each one of said plurality of communication apparatuses, so that a communication apparatus whose address signal output period coincides with the period of said second potential on said communication line is recognized as said transmission end communication apparatus.

15. The synchronous serial transfer method of claim 13, wherein said step (d) includes:

a step (d-1) in which said second potential is outputted only during a priority level signal output period which is assigned, as a priority level signal which indicates said priority level; and a step (d-2) in which whether the period of said second potential on said communication line coincides with said priority level signal output period which is assigned to each one of said plurality of communication apparatuses, so that a communication apparatus whose priority level signal output period coincides with the period of said second potential on said communication line acquires said priority right.

* * * * *